US012784734B2

(12) United States Patent
Yu et al.

(10) Patent No.: US 12,784,734 B2
(45) Date of Patent: Nov. 3, 2026

(54) TRANSLATION SYSTEM, SMART GLASSES FOR TRANSLATION, AND TRANSLATION METHOD BASED ON ARTIFICIAL INTELLIGENCE

(71) Applicant: SOLOS TECHNOLOGY (SHENZHEN) LIMITED, Shenzhen (CN)

(72) Inventors: Chi Sum Yu, Shenzhen (CN); Wai Kuen Cheung, Shenzhen (CN); Kenneth Fan, Shenzhen (CN); Kwok Wah Law, Shenzhen (CN)

(73) Assignee: Solos Technology Limited, Shatin (HK)

( * ) Notice: Subject to any disclaimer, the term of this patent is extended or adjusted under 35 U.S.C. 154(b) by 94 days.

(21) Appl. No.: 18/581,417

(22) Filed: Feb. 20, 2024

(65) Prior Publication Data

US 2025/0095633 A1 Mar. 20, 2025

(30) Foreign Application Priority Data

Sep. 20, 2023 (CN) ......................... 202311222742.4

(51) Int. Cl.
*G10L 15/26* (2006.01)
*G10L 13/08* (2013.01)
*G10L 15/22* (2006.01)

(52) U.S. Cl.
CPC ............ *G10L 13/086* (2013.01); *G10L 15/22* (2013.01); *G10L 2015/221* (2013.01)

(58) Field of Classification Search
CPC ......... G06F 40/40; G10L 15/20; G10L 15/26; H04R 11/00
See application file for complete search history.

(56) References Cited

U.S. PATENT DOCUMENTS 9,579,060 B1 2/2017 Lisy et al.
11,069,368 B2 * 7/2021 Lipman .................. G10L 15/26
(Continued)

FOREIGN PATENT DOCUMENTS

CN 101211335 A 7/2008
CN 104320406 A 1/2015
(Continued)

OTHER PUBLICATIONS

International Search Report from International Application No. PCT/CN2024/0114385, filed Aug. 24, 2024, dated Nov. 6, 2024.
(Continued)

*Primary Examiner* — Daniel Abebe
(74) *Attorney, Agent, or Firm* — Caldwell LLC

(57) ABSTRACT

A translation system, smart glasses for translation and a translation method based on artificial intelligence are provided. The translation system includes first smart glasses, a first smart mobile terminal and a cloud server configured with LLM(s). The smart glasses pick up a first speech in a first language from preset direction and send it to the first terminal. The first terminal converts the first speech into a first text and sends it to the cloud server. The cloud server translates, through the LLM(s), the first text to obtain a second text in a second language according to a translation prompt and sends it to the first terminal. The first terminal converts the second text into a second speech and sends it to the first smart glasses for playback. The present application realizes the high precision intelligent translation based on the smart glasses, and increases the user stickiness in the product.

33 Claims, 8 Drawing Sheets

100

(56) References Cited

U.S. PATENT DOCUMENTS

| | | | | |
|---|---|---|---|---|
| 2014/0337007 | A1* | 11/2014 | Waibel | G06F 40/58 704/2 |
| 2016/0267075 | A1 | 9/2016 | Ishikawa | |
| 2017/0060850 | A1* | 3/2017 | Lewis | G06F 40/58 |
| 2017/0255262 | A1 | 9/2017 | Liu | |
| 2018/0014903 | A1 | 1/2018 | Shan et al. | |
| 2021/0145340 | A1 | 5/2021 | Asukai | |
| 2022/0382999 | A1* | 12/2022 | Gunasekara | G10L 15/142 |
| 2024/0370669 | A1* | 11/2024 | Akiyama | G06F 40/40 |

FOREIGN PATENT DOCUMENTS

| | | | | | |
|---|---|---|---|---|---|
| CN | 206178272 | U | * | 5/2017 | |
| CN | 107561695 | A | * | 1/2018 | |
| CN | 111814497 | A | | 10/2020 | |
| CN | 111985252 | A | | 11/2020 | |
| CN | 113763940 | A | * | 12/2021 | G10L 15/20 |
| CN | 115494936 | A | | 12/2022 | |
| CN | 219225240 | U | * | 6/2023 | |
| JP | 2018083548 | | | 2/2019 | |
| WO | 2015127056 | A2 | | 8/2015 | |
| WO | 2019207896 | A1 | | 10/2019 | |

OTHER PUBLICATIONS

Written Opinion from International Application No. PCT/CN2024/0114385, filed Aug. 24, 2024, dated Nov. 6, 2024.
IPR-2026-00376; Patent 12,216,339, mailed Jun. 23, 2026.
Declaration of John Feland, Ph.D., dated Jun. 18, 2026.

* cited by examiner

1. Pick up native speech in audio format
2. Use speech engine in local or cloud to converse the native speech to native text
3. Generate translation prompt
4. Use speech engine in local or cloud to converse translated text to speech format
5. Playback translated speech on smart glasses
6. Show all speech transcripts on screen, if smart glasses has display

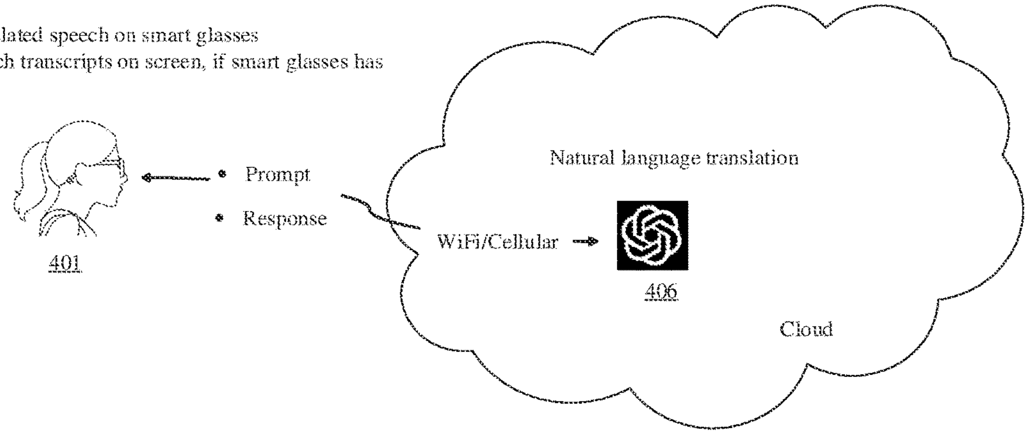

FIG. 6

1. Receive native speech in audio format from smart glasses
2. Use speech engine in local or cloud to converse native speech to text
3. Generate translation prompt
4. Use speech engine in local or cloud to converse translated text to speech format
5. Send translated speech to smart glasses via Bluetooth
6. Show all speech transcripts on screen, if smart glasses has display

- Pick up native speech in audio format (Send)
- Playback translated speech in audio format (Rec)

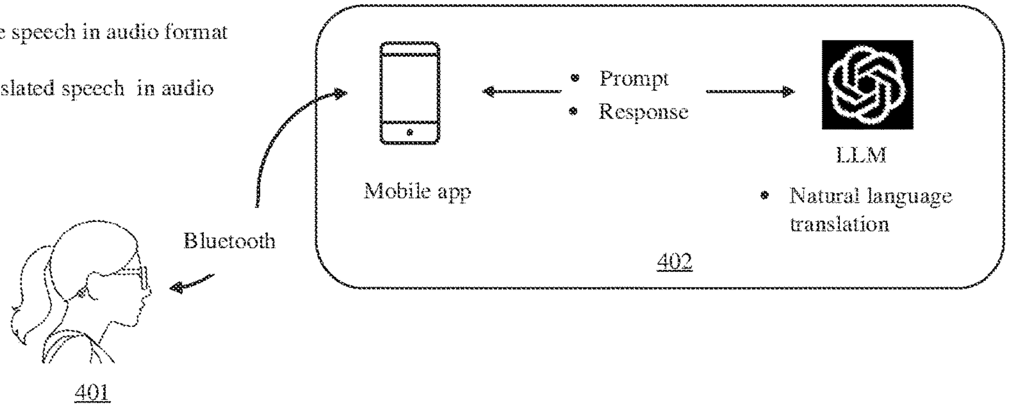

FIG. 7

TRANSLATION SYSTEM, SMART GLASSES FOR TRANSLATION, AND TRANSLATION METHOD BASED ON ARTIFICIAL INTELLIGENCE

CROSS REFERENCE TO RELATED APPLICATIONS

This application claims priority to Chinese Patent Application No. 202311222742.4, filed Sep. 20, 2023, which is hereby incorporated by reference herein as if set forth in its entirety.

BACKGROUND

1. Technical Field

The present disclosure generally relates to the technical field of smart glasses, and in particular to a translation system, smart glasses for translation, and a translation method based on artificial intelligence.

2. Description of Related Art

With the development of computer technology, smart glasses are becoming more and more popular. However, the existing smart glasses are expensive, and in addition to their own functions as smart glasses, they usually only have the functions of listening to music and making or answering calls. Hence, the function of existing smart glasses is relatively simple, and the user stickiness is low in the product.

SUMMARY

The present disclosure provides a translation system, smart glasses for translation, and a translation method based on artificial intelligence (AI), which aim to realize the high precision translation based on the smart glasses, thereby improving the practicality, interactivity and intelligence of the smart glasses, and increasing the user stickiness in the product.

An embodiment of the present disclosure provides a translation system based on artificial intelligence (AI), including: first smart glasses, a first smart mobile terminal and a cloud server, wherein the cloud server is configured with a large language model (LLM), and the LLM comprises a generative artificial intelligence large language model or a multimodal large language model;

- the first smart glasses are used to: pick up a first speech in a first language from a preset direction, and send the first speech to the first smart mobile terminal via Bluetooth;
- the first smart mobile terminal is used to: convert the first speech into a first text using a speech-to-text engine, and send the first text to the cloud server, wherein the speech-to-text engine is configured in the first smart mobile terminal or cloud;
- the cloud server is used to: translate, through the LLM, the first text to obtain a second text in a second language according to a translation prompt, and send the second text to the first smart mobile terminal;
- the first smart mobile terminal is further used to: convert the second text into a second speech using a text-to-speech engine, and send the second speech to the first smart glasses, wherein the text-to-speech engine is configured in the first smart mobile terminal or cloud; and the first smart glasses are further used to play the second speech.

An embodiment of the present disclosure provides smart glasses for translation based on AI, including: a speech pickup device, an output device, a processor and a memory, wherein the processor is electrically connected to the speech pickup device, the output device and the memory;

- one or more computer programs executable on the processor are stored in the memory, and the one or more computer programs include instructions to:
- pick up a first speech in a first language from a preset direction through the speech pickup device;
- translate, through a large language model (LLM) configured in the local or cloud, the first speech to obtain a second speech in a second language, wherein the LLM comprises a generative artificial intelligence large language model or a multimodal large language model; and
- output the second speech through the output device.

An embodiment of the present disclosure provides a translation method based on AI, applied to a smart mobile terminal, including:

- receiving a first speech in a first language sent by a smart wearable device, converting the first speech into a first text using a speech-to-text engine configured in the local or cloud, and obtaining a translation prompt;
- translating, through a large language model (LLM) configured in the local or the cloud, the first text to obtain a second text in a second language according to the translation prompt, wherein the LLM comprises a generative artificial intelligence large language model or a multimodal large language model; and
- converting the second text into a second speech using a text-to-speech engine configured in the local or the cloud, and sending the second speech to the smart wearable device for playback.

In each of the embodiments of the present disclosure, by combining the smart glasses, the smart mobile terminal and the server, the intelligent translation based on the smart glasses is realized, thereby improving the practicality, interactivity and intelligence of the smart glasses, and increasing the user stickiness in the product. Furthermore, due to the scalability and self-creativity of the LLM, the accuracy of the translation can be further improved.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

FIG. 6 is a schematic diagram of a third system framework based on the translation system shown in FIGS. 1 and 3;

FIG. 7 is a schematic diagram of a fourth system framework based on the translation system shown in FIGS. 1 and 3;

DETAILED DESCRIPTION

In order to make the objects, features and advantages of the present disclosure more obvious and easier to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

In the following descriptions, the terms “including”, “comprising”, “having” and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms “first”, “second”, “third”, and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

Figure 1:
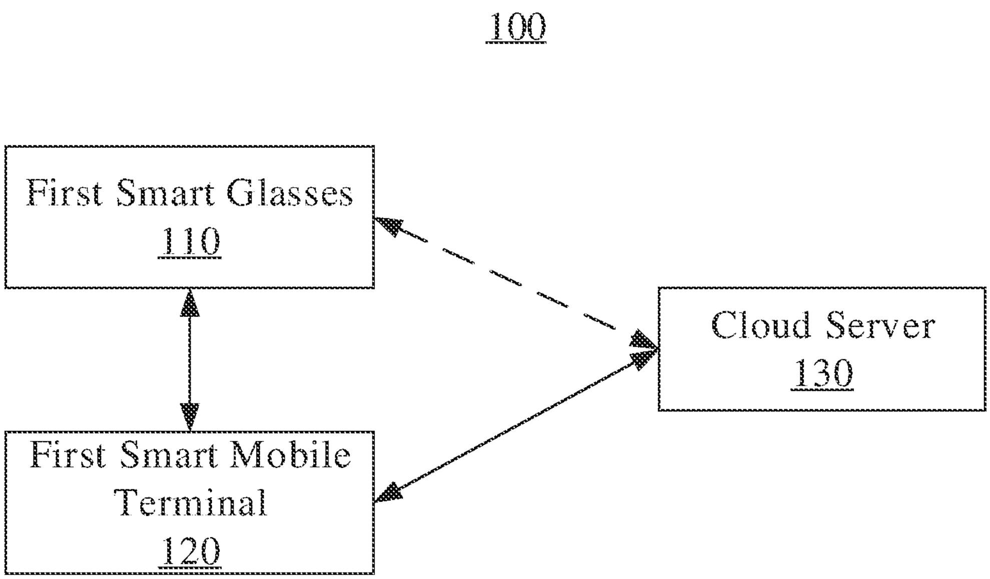
FIG. 1 is a schematic structural diagram of a translation system based on artificial intelligence (AI) according to one embodiment of the present disclosure.

Referring to FIG. 1, a schematic structural diagram of a translation system based on artificial intelligence (AI) according to one embodiment of the present disclosure. As shown in FIG. 1, the translation system 100 includes: first smart glasses 110, a first smart mobile terminal 120 and a cloud server 130.

In each embodiment of the present disclosure, a corresponding application (APP) is installed on each smart glasses or each smart mobile terminal. The smart glasses and the smart mobile terminal establish data connection with each other through Bluetooth, and use the APP for data interaction.

The smart glasses may be open-ear smart glasses, and the specific structure of the smart glasses refer to the relevant descriptions in the following embodiments shown in FIG. 8 and FIG. 9, which is not described here again.

The smart mobile terminal may be include, but is not limited to: cellular phone, smart phone, other wireless communication device, personal digital assistant, audio player, other media player, music recorder, video recorder, camera, other media recorder, smart radio, Laptop computer, personal digital assistant (PDA), portable multimedia player (PMP), Moving Picture Experts Group (MPEG-1 or MPEG-2) audio layer 3 (MP3) player, digital camera, and smart wearable device (such as smart watch, smart bracelet, etc.). An Android, iOS, or operating system is further installed on the smart mobile terminal.

The cloud server 130 may be a single server or a distributed server cluster composed of multiple servers, and is configured with at least one Large Language Model (LLM). The LLM may include at least one Generative Artificial Intelligence Large Language Model (GAILLM), or at least one Multimodal Large Language Model (MLLM), or other large language models with similar functions.

Figure 2:
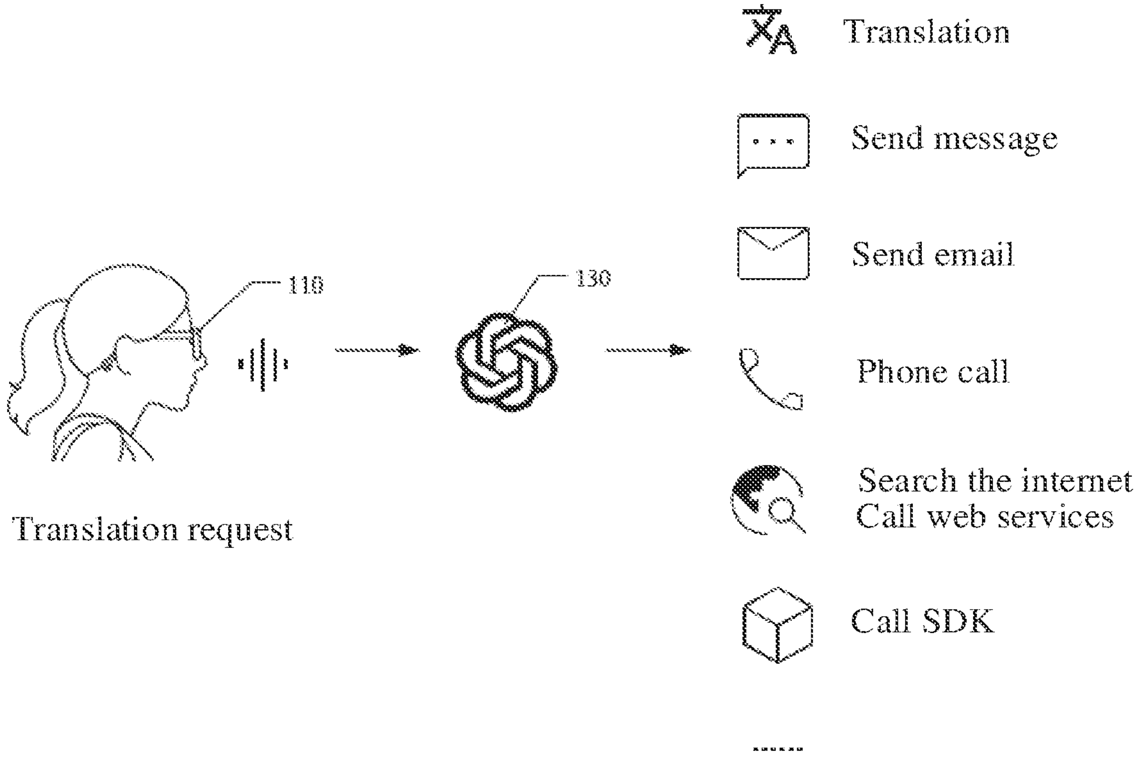
FIG. 2 is a scenario diagram of the translation system shown in FIG. 1.

The GAILLM may be, for example but not limited to: ChatGPT of Open AI, Bard of Google, and other models with similar functions. The LLM integrates multiple functions of: for example, obtaining the task execution command(s) corresponding to the voice command(s) spoken by the user through natural language (as shown in FIG. 2, send message, send email, phone call, search the Internet, call web services, and call other third-party Software Development Kit (SDK) to perform task(s) provided by the SDK), translation, etc. The part of LLM that obtains the task execution command(s) is trained using a large number of semantics and task execution commands corresponding to the semantics as samples. The part of LLM that is used for translation is trained using a large number of words and/or sentences in the source language and words and/or sentences in the target language corresponding to the words and/or sentences in the source language as samples. One source language may correspond to several different target languages.

Specifically, the first smart glasses 110 are used to: pick up a first speech in a first language (i.e., source language) from a preset direction, and send the first speech to the first smart mobile terminal 120 via Bluetooth. Optionally, the preset direction may point to the front of a user of the first smart glasses 110, that is, a listening mode, and in the listening mode, the language spoken by the chat partner of the user of the first smart glasses 110 is the source language. Alternatively, the preset direction may point to the mouth of the user of the first smart glasses 110, that is, a talking mode, and in the talking mode, the language spoken by the user of the first smart glasses 110 is the source language. In response to a voice command of the user, or an action of the user pressing the control button on the first smart glasses 110 which is used for switching the translation mode, or action(s) of the user in a User Interface (UI) of the first smart mobile terminal 120, the first smart glasses 110 switch the current translation mode to a corresponding mode. Furthermore, the source language and target language are determined according to the current translation mode.

The first smart mobile terminal 120 is used to: convert the first speech into a first text using a speech-to-text engine, and send the first text to the cloud server 130. The speech-to-text engine is configured in the first smart mobile terminal 120 or cloud (such as, a speech-to-text server, a model server, a translation server, or other cloud server).

The cloud server 130 is used to: translate, through the LLM, the first text to obtain a second text in a second language (i.e., the target language) according to a translation prompt, and send the second text to the first smart mobile terminal 120.

The first smart mobile terminal 120 is further used to: convert the second text into a second speech using a text-to-speech engine, and send the second speech to the first smart glasses 110 via Bluetooth. The text-to-speech engine is configured in the first smart mobile terminal 120 or cloud (such as, a text-to-speech server, the model server, the translation server, or other cloud server).

The first smart glasses 110 is further used to play the second speech.

The translation prompt may include instruction information for instructing the LLM to perform a translation task. Furthermore, the translation prompt further includes: identification information of the first language and/or the second language. The translation prompt may be generated by a prompt generator. The prompt generator may be a software module or a micro-controller configured with the software module, and is used to generate corresponding prompt information according to the parsed semantics in the user speech, where the semantics are obtained by parsing each user speech. Alternatively, the prompt generator may generate the translation prompt according to other preset rules, for example, receiving a translation instruction, receiving a text sent by a specific object, receiving data containing identification information of the language, etc.

The prompt generator may be configured in the smart glasses 110, the first smart mobile terminal 120, or any server in the cloud.

Optionally, in one embodiment of the present disclosure, the prompt generator obtains identification information of the first language and/or the second language from the smart glasses 110 or the first smart mobile terminal 120.

Optionally, in other embodiments of the present disclosure, the first smart mobile terminal 120 is further used to generate the translation prompt, and send the translation prompt to the cloud server 130.

Optionally, in other embodiments of the present disclosure, a mobile application (APP) is installed on the first smart mobile terminal 120.

The first smart mobile terminal 120 is further used to: in response to a preset action of a user, send, through the mobile APP, a translation instruction to the first smart glasses 110. The preset action may be, for example, but not limited to, any one of the following actions: the user pressing a virtual button preset on the UI of the mobile APP which is used for starting translation, the user performing one or more preset sliding gestures on the screen of the first smart glasses 110 or the first smart mobile terminal 120, the user pressing a translation control button provided on the temple(s) of the first smart glasses 110, and the user speaking a preset translation voice command, etc.

The first smart glasses 110 is further used to: enter a translation mode in response to the translation instruction, and pick up the first speech from the preset direction in the translation mode.

Figure 3:
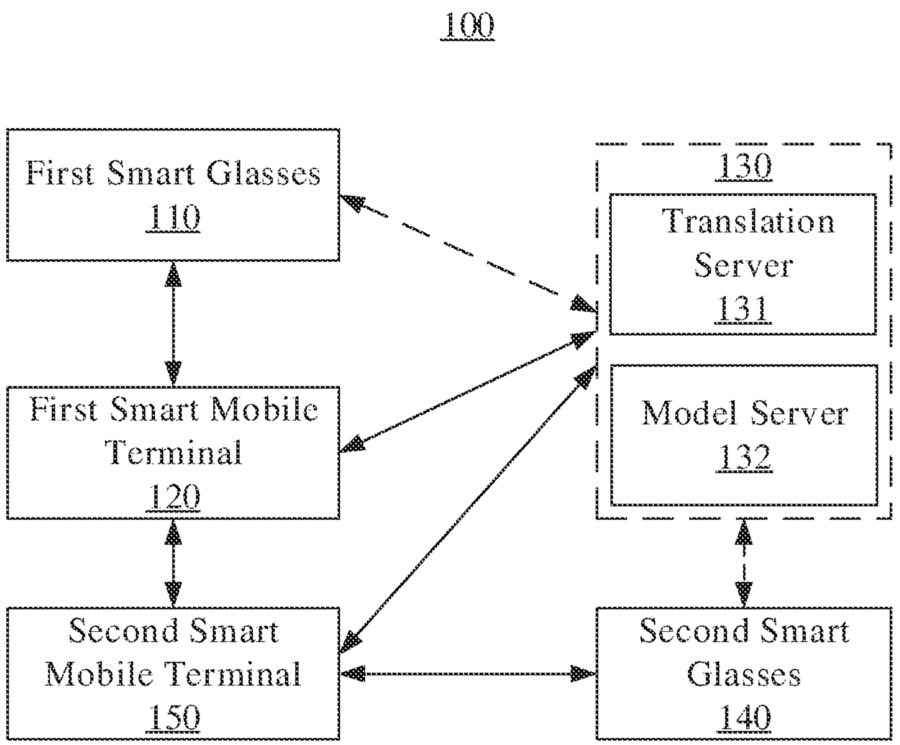
FIG. 3 is a schematic structural diagram of the translation system based on AI according to another embodiment of the present disclosure.

Optionally, in other embodiments of the present disclosure, as shown in FIG. 3, a mobile APP is installed on the first smart mobile terminal 120, the cloud server 130 includes a translation server 131 and a model server 132 (or, it can also be called LLM server), and the LLM is configured in the model server 132.

The first smart mobile terminal 120 is further used to, in response to a user pressing a button on a screen of the first smart mobile terminal 120, send a speech picking up instruction to the first smart glasses 110 through the mobile APP. The button is generated by the mobile APP.

The first smart glasses 110 is further used to pick up the first speech from the preset direction in response to the speech picking up instruction.

The first smart mobile terminal 120 is further used to, in response to the user releasing the button, send the first text to the translation server 131 through the mobile APP.

The translation server 131 is used to: generate the translation prompt, and send the first text and the translation prompt to the model server 132.

The model server 132 is used to: translate, through the LLM, the first text to obtain the second text according to the translation prompt, and send the second text to the translation server 131.

The translation server 131 is further used to send the second text to the first smart mobile terminal 120.

Optionally, in other embodiments of the present disclosure, as shown in FIG. 3, the cloud server 130 includes a translation server 131 and a model server 132, a mobile APP is installed on the first smart mobile terminal 120, and the LLM is configured in the model server 132.

The first smart glasses 110 are further used to, in response to a user pressing a virtual button on a temple of the first smart glasses 110, pick up the first speech from the preset direction.

The first smart glasses 110 are further used to, in response to the user releasing the virtual button, send a notification message to the mobile APP via Bluetooth.

The first smart mobile terminal 120 is further used to send, through the mobile APP, the first text to the translation server 131 according to the notification message.

The translation server 131 is used to: generate the translation prompt, and send the first text and the translation prompt to the model server 132.

The model server 132 is used to: translate, through the LLM, the first text to obtain the second text according to the translation prompt, and send the second text to the translation server 131.

The translation server 131 is further used to send the second text to the first smart mobile terminal 120.

Optionally, in other embodiments of the present disclosure, a mobile APP is installed on the first smart mobile terminal 120, and the first smart mobile terminal 120 is further used to: generate, through the mobile APP, translation transcript(s) according to the second text, or the first text and the second text, and display the translation transcript(s) on a screen of the first smart mobile terminal 120; and save, through the mobile APP, the translation transcript(s) on the first smart mobile terminal 120 or a storage server.

Optionally, in other embodiments of the present disclosure, the first smart mobile terminal 120 is further used to: in response to an action of a user performed on a sharing button on the UI of the mobile APP being detected, sharing, through the mobile APP, the translation transcript(s) according to a sharing manner indicated by the action.

The sharing may be, for example but not limited to: sharing the translation transcript(s) with the friend(s) of the first smart glasses 110 registered in instant messaging software such as WeChat; or sharing the translation transcript(s) with other terminal equipment via the email; or sharing the translation transcript(s) on social networking platform(s), such as Facebook, Instagram, etc. The user can view the translation transcript(s) on a sharing terminal in the form of full translation or comparison between the original text and the translation. Some or all of the translation transcript(s) generated during one or more translation periods specified by the user can be shared. A process of smart glasses from entering translation mode to exiting translation mode can be regarded as one translation period.

Optionally, in other embodiments of the present disclosure, a mobile APP is installed on the first smart mobile terminal 120, and the first smart mobile terminal 120 is further used to: generate, through the mobile APP, the second speech with a preset playback speed, and send the second speech with the preset playback speed to the first smart glasses 110 for playback via the Bluetooth.

Optionally, in other embodiments of the present disclosure, a mobile APP is installed on the first smart mobile terminal 120.

The first smart mobile terminal 120 is further used to set up the second language according to a setting action performed by a user through the mobile APP.

The first smart glasses 110 are further used to: perform a speech picking up action, and send the picked-up speech to the first smart mobile terminal 120 in real time via Bluetooth in a form of data stream.

The first smart mobile terminal 120 is further used to: detect whether a language of the received speech is the first language using the speech-to-text engine; in response to the language being the first language, send a starting translation instruction to the first smart glasses 110 via the Bluetooth, convert the received speech as the first speech into a first text through the speech-to-text engine, and send the first text and the translation prompt to the model server 132, wherein the translation prompt includes information of the first language and the second language; and in response to a silence of a preset duration being detected, send a stopping translation instruction to the first smart glasses 110 via the Bluetooth, The first smart glasses 110 are further used to: enter a translation mode in response to the starting translation instruction; and in response to the stopping translation instruction, exit the translation mode and end the speech picking up action.

Specifically, after smart glasses are powered on or according to a listening instruction triggered by a user, the smart glasses perform a speech picking up action to listen a user speech in real time, and send the real-time listened speech to the smart mobile terminal in the form of data stream. The real-time listened speech is cached in the memory of the smart glasses. During the listening, the smart glasses use the multiple threads to overwrite the old speech with the newly picked-up speech of the preset duration continuously in the memory (for example, overwrite the previously picked-up voice of 3 seconds with the currently picked-up speech of 3 seconds), and simultaneously send the cached newly picked-up speech to the smart mobile terminal. The smart mobile terminal stores the received speech in the local memory, and determines whether the language of the received speech is the first language. On the one hand, when the language is not the first language, the smart mobile terminal deletes the received speech from the local memory, and continues to perform the action of determining whether the language of the received speech is the first language based on the newly received speech, until no new speech sent by the smart glasses is received for a preset time period, or until receiving a notification message of stopping listen sent by the smart glasses On the other hand, when the language is the first language, the smart mobile terminal sends a starting translation instruction to the smart glasses, and performs the translation action on the received speech. The smart glasses enter the translation mode according to the starting translation instruction, and continue to perform the speech picking up action. Furthermore, when a silence of a preset duration is detected in the speech stored in the local memory, the smart mobile terminal sends a stopping translation instruction to the smart glasses, so that the smart glasses exit the translation mode and end the speech picking up action according to the stopping translation instruction.

Optionally, in other embodiments of the present disclosure, as shown in FIG. 3, the cloud server 130 includes a translation server 131 and a model server 132, and the LLM is configured in the model server 132.

The first smart glasses 110 are further used to send the first speech to the translation server 131 via a wireless network.

The translation server 131 is used to: convert the first speech into a first text using a speech-to-text engine, generate a translation prompt, and send the first text and the generated translation prompt to the model server 132.

The model server 132 is used to: translate, through the LLM, the first text to obtain the second text according to the translation prompt, and send the second text to the translation server 131.

The translation server 131 is further used to: convert the second text into a second speech using a text-to-speech engine, and send the second speech to the first smart glasses 110 via the wireless network.

Optionally, in other embodiments of the present disclosure, the preset direction points to the mouth of the user of the first smart glasses 110. As shown in FIG. 3, the translation system 100 further includes second smart glasses 140 and a second smart mobile terminal 150.

The first smart mobile terminal 120 is further used to send the second speech to the second smart mobile terminal 150.

The second smart mobile terminal 150 is used to send the second speech to the second smart glasses 140.

The second smart glasses 140 is used to play the second speech.

Optionally, in other embodiments of the present disclosure, the first smart mobile terminal 120 is further used to: generate, through a mobile APP on the first smart mobile terminal 120, translation transcript(s) in real time according to the first text and the second text, store the translation transcript(s) in the first smart mobile terminal 120, display the translation transcript, and synchronize the translation transcript(s) to the second smart mobile terminal 150.

The second smart mobile terminal 150 is further used to: store the translation transcript(s) in the second smart mobile terminal 150, and display the translation transcript(s) through a mobile APP on the second smart mobile terminal 150.

Specifically, the mobile APP on the second smart mobile terminal 150 displays the translation transcript(s) in a form of list on the screen of the second smart mobile terminal 150. The user of the second smart mobile terminal 150 views different parts of the translation transcript(s) by: performing a preset scrolling gesture on the screen, or using physical or virtual button(s) on the second smart mobile terminal 150, or the voice control instruction(s).

Optionally, in other embodiments of the present disclosure, as shown in FIG. 3, the cloud server 130 includes a translation server 131, the translation system 100 further includes a plurality of second smart glasses, and the LLM is configured in the translation server 131.

The first smart glasses 110 is further used to: in response to a user of the first smart glasses 110 pressing a button on a temple of the first smart glasses 110, pick up a first speech of a user of the first smart mobile terminal 120, and send the first speech to the first smart mobile terminal 120 via Bluetooth.

The first smart mobile terminal 120 is further used to convert, through a mobile APP on the first smart mobile terminal 120, the first speech into a first text using a speech-to-text engine, and send the first text to the translation server 131.

The translation server 131 is used to: generate a first translation prompt, translate, through the LLM, the first text to obtain a plurality of third texts according to the first translation prompt, and distribute each of the third texts to corresponding second smart glasses, wherein a language of each of the third texts corresponds to a language spoken by a user of each of the second smart glasses 140.

The second smart glasses 140 are used to: convert the received third text into a third speech using a text-to-speech engine, and play the third speech.

Optionally, in other embodiments of the present disclosure, the second smart glasses 140 are further used to: in response to a user of the second smart glasses 140 pressing a virtual button on a temple of the second smart glasses 140, pick up a fourth speech of a user of the second smart glasses 140, convert the fourth speech into a fourth text through a speech-to-text engine, and send the fourth text to the translation server 131.

The translation server 131 is used to: generate a second translation prompt, translate, through the LLM, the fourth text to obtain a fifth text according to the second translation prompt, and send the fifth text to the first smart glasses 110, wherein a language of the fifth text corresponds to a language spoken by a user of the first smart glasses 110.

The first smart glasses 110 are further used to: convert the fifth text into a fifth speech using a text-to-speech engine, and play the fifth speech.

Optionally, in other embodiments of the present disclosure, as shown in FIG. 3, the cloud server 130 includes a translation server 132, and the LLM is configured in the model server 132.

Figure 4:
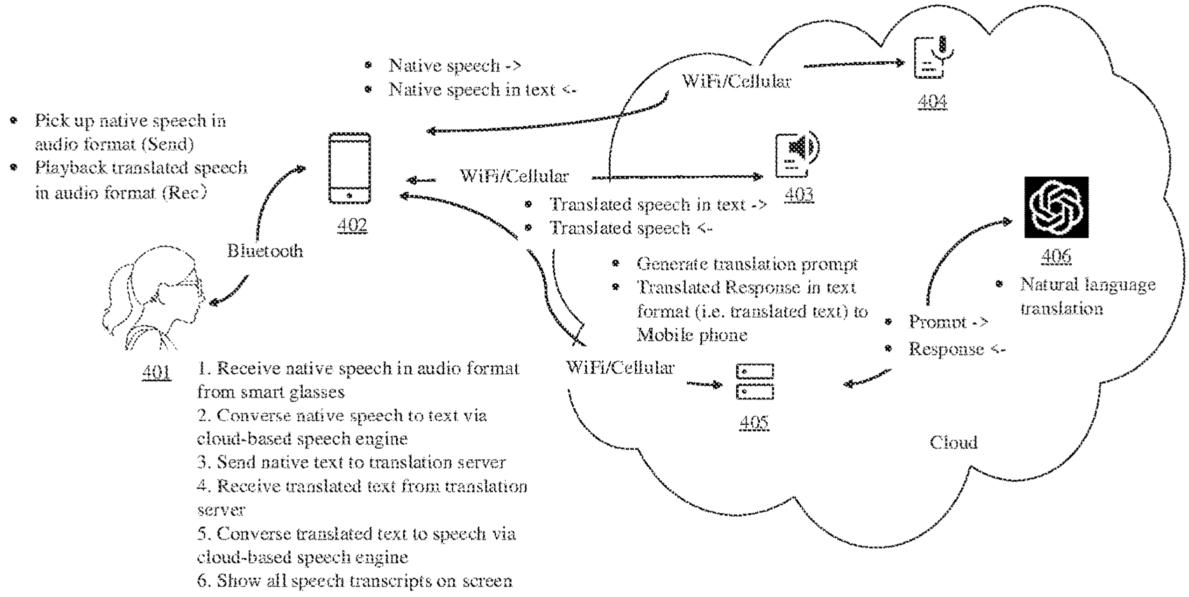
FIG. 4 is a schematic diagram of a first system framework based on the translation system shown in FIGS. 1 and 3.

Referring to FIG. 4, a schematic diagram of a first system framework based on the translation system shown in FIGS. 1 and 3. As shown in FIG. 4, the translation system includes: smart glasses 401, a smart mobile terminal 402, a text-to-speech server 403, a speech-to-text server 404, a translation server 405 and a model server 406. A text-to-speech engine is configured in the text-to-speech server 403, a speech-to-text engine is configured in the speech-to-text server 404, a prompt generator is configured in the translation server 405, and a LLM is configured in the model server 406.

In steps 1 to 6 of FIG. 4, when a user presses a virtual button on a temple of the smart glasses 401 worn on the user, the smart glasses 401 pick up a native speech of the user (i.e., the first speech), and send the native speech in audio format to a mobile APP on the smart mobile terminal 402. The mobile APP converts the native speech to a native text (i.e., the first text) by data interaction with the speech-to-text server 404, and sends the native text returned by the speech-to-text server 404 to the translation server 405. The translation server 405 generates a translation prompt, and send the translation prompt and the native text to the model server 406, so that the model server 406 performs a natural language translation on the native text using LLM according to the translation prompt, and obtains a translated text (i.e., the second text). The translation server 405 receives the translated text returned by the model server 406, and forwards the translated text to the smart mobile terminal 402. The smart mobile terminal 402 converts the translated text into a corresponding speech by data interaction with the text-to-speech server 403, sends the corresponding speech returned by the text-to-speech server 403 to the smart glasses 401 for playback, and simultaneously displays the translated text on the screen of the smart mobile terminal 402.

Figure 5:
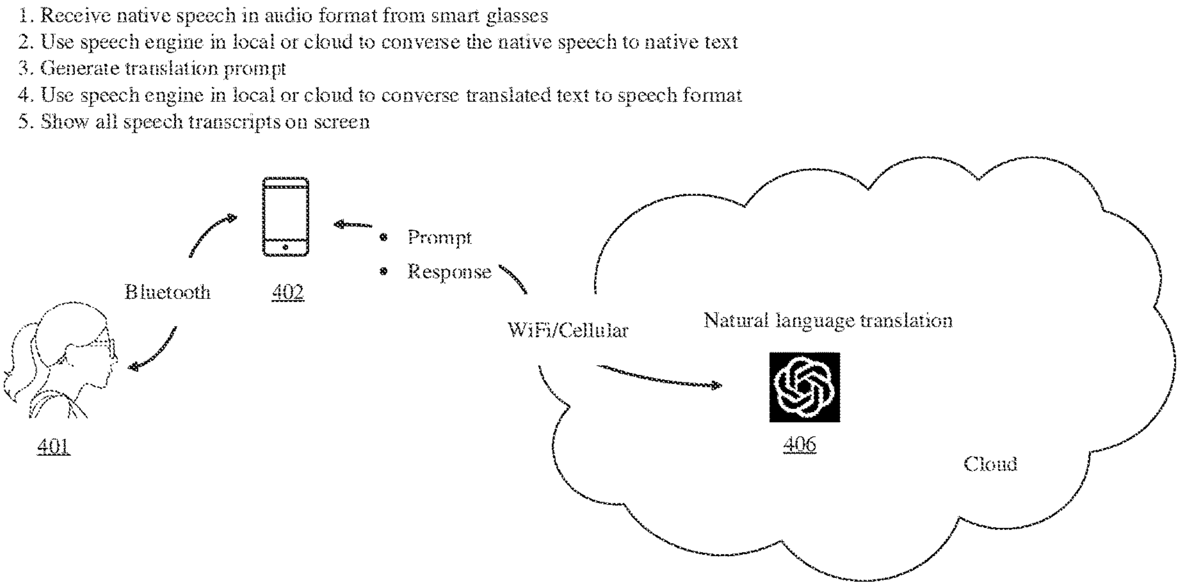
FIG. 5 is a schematic diagram of a second system framework based on the translation system shown in FIGS. 1 and 3.

Referring to FIG. 5, a schematic diagram of a second system framework based on the translation system shown in FIGS. 1 and 3. As shown in FIG. 5, the translation system includes: smart glasses 401, a smart mobile terminal 402 and a model server 406. A text-to-speech engine, a speech-to-text engine and a prompt generator are configured in the smart mobile terminal 402, and a LLM is configured in the model server 406.

In steps 1 to 5 of FIG. 5, when a user presses a virtual button on a temple of the smart glasses 401 worn on the user, the smart glasses 401 pick up a native speech of the user (i.e., the first speech), and send the native speech in audio format to a mobile APP on the smart mobile terminal 402. The mobile APP converts the native speech to a native text (i.e., the first text) by the speech-to-text engine, generates a translation prompt by the prompt generator, and sends the native text and the translation prompt to the model server 406, so that the model server 406 performs a natural language translation on the native text using LLM according to the translation prompt, and obtains a translated text (i.e., the second text). The mobile APP receives the translated text returned by the model server 406, converts the translated text into a corresponding speech by the text-to-speech engine, sends the corresponding speech to the smart glasses 401 for playback, and simultaneously displays the translated text on the screen of the smart mobile terminal 402.

It is understandable that the aforementioned text-to-speech engine and speech-to-text engine can also be configured in one or more cloud servers, and the mobile APP performs the actions of text-to-speech and speech-to-text by data interaction with the one or more cloud servers.

Referring to FIG. 6, a schematic diagram of a third system framework based on the translation system shown in FIGS. 1 and 3. As shown in FIG. 6, the translation system includes: smart glasses 401 and a model server 406. LLM(s) are configured in the model server 406.

In steps 1 to 6 of FIG. 6, when a user presses a virtual button on a temple of the smart glasses 401 worn on the user, the smart glasses 401 pick up a native speech of the user (i.e., the first speech) through a built-in client APP, convert the native speech into a native text (i.e., the first text) using a speech-to-text engine configured in the local or cloud, generate a translation prompt by a prompt generator configured in the local or cloud, and send the native text and the translation prompt to the model server 406, so that the model server 406 performs a natural language translation on the native text using the LLM(s) according to the translation prompt, and obtains a translated text (i.e., the second text). The smart glasses 401 receive, through the client APP, the translated text returned by the model server 406, convert the translated text into a corresponding speech using a text-to-speech engine configured in the local or cloud, play the corresponding speech, and simultaneously display the translated text on a screen of the smart glasses 401.

Furthermore, the client APP further generates translation transcript(s) based on the native text and the translated text, and allows the user to view the translation transcript(s) on the screen of smart glasses 401 by performing preset action(s). Furthermore, the client APP further shares the translation transcript(s) with other terminal(s) or social networking platform(s) specified by the user according to the sharing voice command of the user.

It is understandable that the aforementioned text-to-speech engine, speech-to-text engine and prompt generator can also be configured in one or more cloud servers, and the client APP performs the actions of text-to-speech, speech-to-text and translation prompt generation by data interaction with the one or more cloud servers.

Referring to FIG. 7, a schematic diagram of a fourth system framework based on the translation system shown in FIGS. 1 and 3. As shown in FIG. 7, the translation system includes: smart glasses 401 and a smart mobile terminal 402. A text-to-speech engine, a speech-to-text engine, a prompt generator and a LLM are configured in the smart mobile terminal 402.

In steps 1 to 6 of FIG. 7, when a user presses a virtual button on a temple of the smart glasses 401 worn on the user, the smart glasses 401 pick up a native speech of the user (i.e., the first speech), and send the native speech in audio format to a mobile APP on the smart mobile terminal 402. The mobile APP converts the native speech to a native text (i.e., the first text) by the speech-to-text engine, generates a translation prompt by the prompt generator, and inputs the translation prompt and the native text into the LLM, so that the LLM performs a natural language translation on the native text according to the translation prompt, and outputs a translated text (i.e., the second text). The mobile APP converts the translated text into a corresponding speech by the text-to-speech engine, sends the corresponding speech to the smart glasses 401 for playback, and simultaneously displays the translated text on the screen of the smart mobile terminal 402.

Furthermore, when the mobile APP determines that the smart glasses 401 has a screen based on a device information record, the mobile APP sends the translated text to the smart glasses 401 for display on the screen of the smart glasses 401.

Furthermore, the mobile APP further generates translation transcript(s) based on the native text and the translated text, and allows the user to view the translation transcript(s) on the screen of the smart glasses 401 or the screen of the smart mobile terminal 402 by performing preset action(s). Furthermore, the mobile APP further shares the translation transcript(s) with other terminal(s) or social networking platform(s) specified by the user, according to the sharing voice command of the user, or the preset sharing action(s) of the user performed on the UI of the mobile APP.

It is understandable that the aforementioned text-to-speech engine, speech-to-text engine and prompt generator can also be configured in one or more cloud servers, and the mobile APP performs the actions of text-to-speech, speech-to-text and translation prompt generation by data interaction with the one or more cloud servers.

In the embodiment, by combining the smart glasses, smart mobile terminal and server, the intelligent translation based on the smart glasses is realized, thereby improving the practicality, interactivity and intelligence of the smart glasses, and increasing the user stickiness in the product. Moreover, due to the scalability and self-creativity of the LLM, the accuracy of translation can be further improved.

Figure 8:
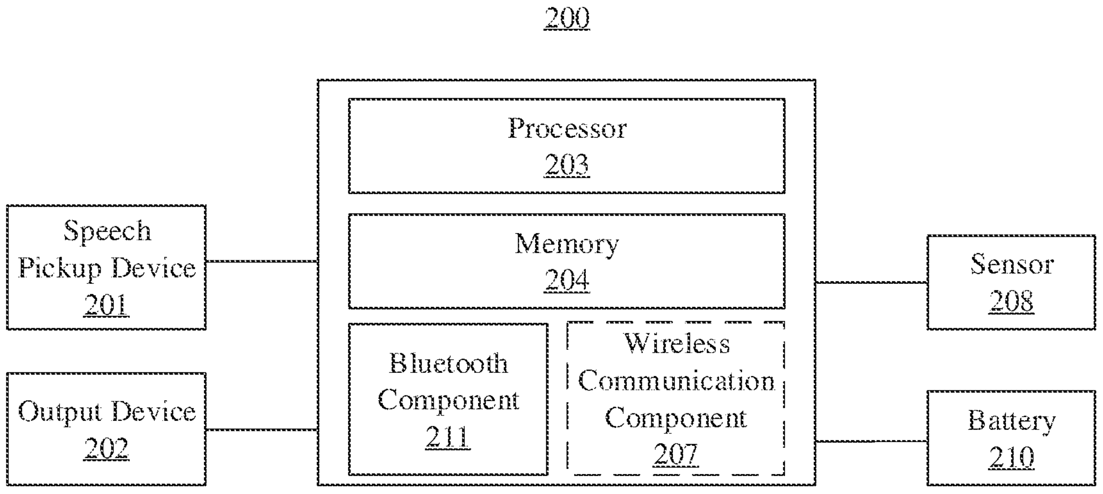
FIG. 8 is a schematic diagram of an internal structure of smart glasses for translation based on AI according to one embodiment of the present disclosure.
Figure 9:
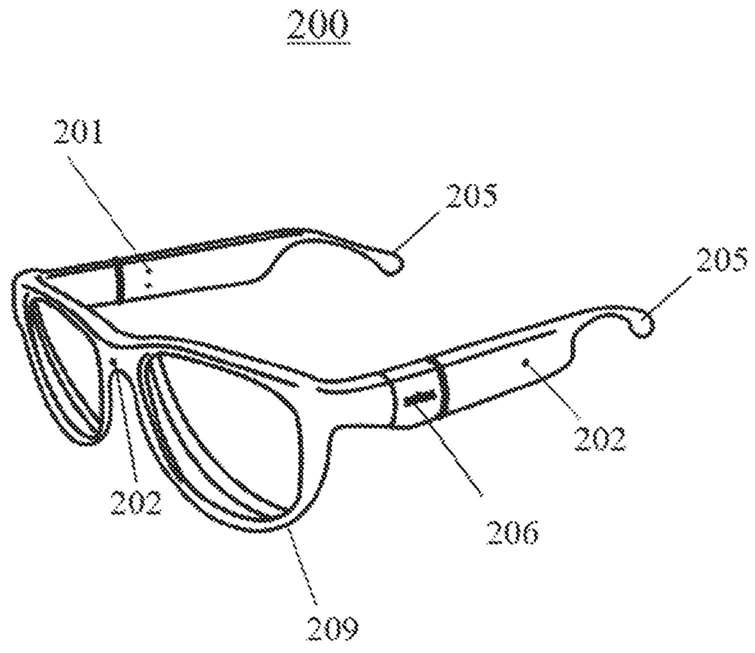
FIG. 9 is a schematic diagram of an external structure of the smart glasses shown in FIG. 8.

Referring to FIG. 8 and FIG. 9, FIG. 8 is a schematic diagram of an internal structure of smart glasses for translation based on AI according to one embodiment of the present disclosure, and FIG. 9 is a schematic diagram of an external structure of the smart glasses shown in FIG. 8. For ease of description, only parts related to the embodiment of the present disclosure are shown in the figures. In practice, the smart glasses may have more or fewer structures. As shown in FIG. 8, the smart glasses 200 include: a speech pickup device 201, an output device 202, at least one processor 203 and at least one memory 204.

The at least one processor 203 is electrically connected to the speech pickup device 201, the output device 202 and the at least one memory 204.

The speech pickup device 201 includes at least one microphone. Optionally, the speech pickup device 201 includes at least one directional microphone and/or at least one omni-directional microphone. Specifically, the speech pickup device 201 may be a single microphone or a microphone array composed of multiple microphones, for example, a microphone array consisting of at least one directional microphone and/or at least one omni-directional microphone. The output device 202 includes at least one speaker.

The processor 203 includes: a CPU (Central Processing Unit/Processor) and a DSP (Digital Signal Processing). The DSP is used to process the speech data (or the voice data) obtained by the microphone 203. Preferably, the CPU is a MCU (Micro-controller Unit).

The memory 204 is a non-transitory memory, and specifically may include: a RAM (Random Access Memory) and a flash memory component. One or more computer programs executable on the processor 203 are stored in the memory 204, and the one or more computer programs include instructions. The instructions are used to: pick up a first speech in a first language from a preset direction through the speech pickup device 201; translate, through a LLM configured in the local or cloud, the first speech to obtain a second speech in a second language; and output, through the output device 202, the second speech.

Optionally, in other embodiments of the present disclosure, the preset direction points to the front of a user.

Optionally, in other embodiments of the present disclosure, a client program is installed on the smart glasses 200, and the instructions are further used to set up the first language and/or the second language according to a first preset action of the user performed on the client program Optionally, in other embodiments of the present disclosure, the instructions are further used to set up a playback speed of the second speech according to a second preset action of the user performed on the client program.

Optionally, in other embodiments of the present disclosure, the smart glasses 200 further include a Bluetooth component 211 electrically connected to the processor 203, and the instructions are further used to: receive, by the Bluetooth component 211, a translation instruction sent by a mobile application on a smart mobile terminal, enter a translation mode in response to the translation instruction, and pick up the first speech from the preset direction through the speech pickup device 201 in the translation mode.

The Bluetooth component 211 includes a Bluetooth signal transceiver and its peripheral circuits, and may be specifically provided in an inner cavity of the front frame 209 and/or at least one temple 205. The Bluetooth component 211 can be linked with smart mobile terminals such as smartphones or smart watches, to take phone calls, and music and data communications.

Optionally, in other embodiments of the present disclosure, as shown in FIG. 9, the smart glasses 200 further include: at least one temple 205 and a virtual button 206 provided on the temple 205, the virtual button 206 is based on a touch sensor and is electrically connected to the processor 203, and the instructions are further used to: in response to the user pressing the virtual button, control the speech pickup device 201 to pick up the first speech; in response to the user releasing the virtual button, send, through the Bluetooth component 211, the first speech to the smart mobile terminal, so as to translate, through the smart mobile terminal, the first speech into the second speech using a LLM configured in the smart mobile terminal or a cloud server; and receive, through the Bluetooth component 211, the second speech sent by the smart mobile terminal.

The at least one temple 205 may include, for example, a left temple and a right temple.

Optionally, in other embodiments of the present disclosure, the instructions are further used to: perform, through a speech-to-text engine configured in the local or cloud, a language detection on the first speech to determine whether the first language is a preset language; in response to the first language being the preset language, enter a translation mode, convert, through the speech-to-text engine, the first speech into a first text; generate a translation prompt, and translate, through the LLM, the first text to obtain the second text in the second language, wherein the translation prompt includes information of the first language and the second language; convert, through a text-to-speech engine configured in the local or cloud, the second text into the second speech; and in response to a silence of a preset duration being detected by the speech pickup device 201, exit the translation mode.

Optionally, in other embodiments of the present disclosure, the smart glasses 200 further include a wireless communication component 207 electrically connected to the processor 203, and the instructions are further used to: send, through the wireless communication component 207, the first speech to a translation server, so as to translate, by the translation server, the first speech into the second speech using a LLM configured in the translation server or a model server; and receive, through the wireless communication component 207, the second speech sent by the translation server.

The wireless communication component 207 includes a wireless signal transceiver and its peripheral circuits, and may be specifically provided in an inner cavity of the front frame 209 and/or at least one temple 205 of the smart glasses 200. The wireless signal transceiver may, but is not limited to, use at least one of the WiFi (Wireless Fidelity) protocol, the NFC (Near Field Communication) protocol, the ZigBee protocol, the UWB (Ultra-Wide Band) protocol, the RFID (Radio Frequency Identification) protocol, and the cellular mobile communication protocol (such as 3G/4G/5G, etc.) to perform the data transmission.

Optionally, in other embodiments of the present disclosure, the output device 202 includes front speaker(s), the preset direction points to the front of a user, and the instructions are further used to play the second speech through the front speaker(s).

Optionally, in other embodiments of the present disclosure, the smart glasses 200 further include a Bluetooth component 211 electrically connected to the processor 203, the preset direction points to the mouth of a user, and the instructions are further used to send, through the Bluetooth component 211, the second speech to an external player for playback.

Optionally, in other embodiments of the present disclosure, the smart glasses 200 further include an inertial measurement unit (IMU) sensor 208 electrically connected to the processor 203, and the instructions are further used to: detect whether the first speech ends using a VAD (voice activity detection) algorithm and/or sensing data of the IMU; and in response to the end of the first speech being detected, translate, through the LLM, the first speech to obtain the second speech.

The working principle of the VAD algorithm is to detect whether the user is speaking by detecting changes in the energy of speech. When the user speaks, the energy of the speech will increase, and hence the VAD algorithm can distinguish whether there is voice or no voice by detecting the changes in the energy of speech.

Detecting whether the first speech ends using the sensing data of the IMU sensor mainly includes: using the IMU sensor to detect the vibration generated when the user speaks (such as, accelerator), and when the vibration stops for longer than the preset time, it means that the user has finished speaking.

Optionally, in addition to IMU sensor 208, the smart glasses 200 may further include other data sensing components electrically connected to processor 203, such as at least one of: a positioning component, a touch sensor, a temperature sensor, a proximity sensor, a humidity sensor, an electronic compass, a timer, a camera and a pedometer. The positioning component may be, but not limited to, the positioning component based on the GPS (Global Positioning System) or the Beidou satellite.

Furthermore, the smart glasses 200 may further include a frame 209 and a battery 210. The frame 209 may be, for example, a front frame with a lens (e.g., a sunglass lens, a clear lens, or a corrective lens). Preferably, the at least one temple 205 is detachably connected to the front frame 209.

Furthermore, at least one physical control button is provided on the at least one temple 205 and the frame 209, such as a power button, volume control button(s), translation mode switching button(s), etc.

Optionally, in other embodiments of the present disclosure, the smart glasses 200 may further include a display screen electrically connected to the processor 203, and the display screen is used to display the aforementioned second text or translation transcript(s).

The battery 210 is used for providing power to the aforementioned electronic components on the smart glasses 100, such as the speech pickup device 201, the output device 202, the at least one processor 203, the at least one memory 204, the virtual button 206, the wireless communication component 207, the IMU sensor 208 and the Bluetooth component 211, etc.

The various electronic components of the aforementioned smart glasses are connected through a bus.

It should be noted that, the relationship between the components of the aforementioned smart glasses is a substitution relationship or a superposition relationship. That is, all the aforementioned components in the embodiment are installed on the smart glasses, or some of the aforementioned components selectively are installed according to requirements. When the relationship is an alternative relationship, the smart glasses are further provided with at least one of a peripheral connection interface, for example, a PS/2 interface, a serial interface, a parallel interface, an IEEE1394 interface, and a USB (Universal Serial Bus) interface. The function of the replaced component is realized through the peripheral device connected to the connection interface, and the peripheral device such as external speaker, external sensor, etc.

For unspecified details about the smart glasses in this embodiment, please refer to the relevant descriptions in the embodiments of the translation system shown in FIG. 1 to FIG. 7 and the embodiments of the translation method shown in FIG. 10 to FIG. 14, which will not be described again here.

In the embodiment, by using the LLM(s) through the smart glasses, the intelligent translation based on the smart glasses is realized, thereby improving the practicality, interactivity and intelligence of the smart glasses, and increasing the user stickiness in the product. Moreover, due to the scalability and self-creativity of the LLM, the accuracy of translation can be further improved.

Figure 10:
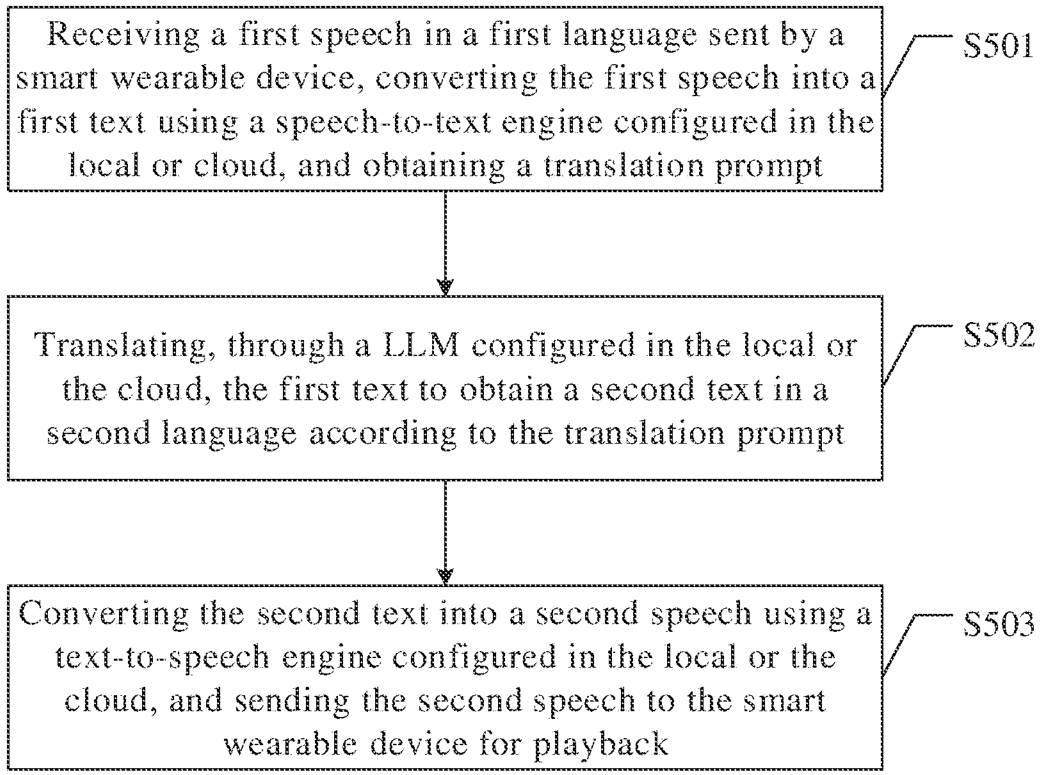
FIG. 10 is a flow diagram of a translation method based on AI according to one embodiment of the present disclosure.

Referring to FIG. 10, a flow diagram of a translation method based on AI according to one embodiment of the present disclosure. The method can be applied to the first smart mobile terminal 120 or the second smart mobile terminal 150 in the translation system shown in FIG. 1. As shown in FIG. 10, the method includes:

S501, receiving a first speech in a first language sent by a smart wearable device, converting the first speech into a first text using a speech-to-text engine configured in the local or cloud, and obtaining a translation prompt;

S502, translating, through a large language model (LLM) configured in the local or the cloud, the first text to obtain a second text in a second language according to the translation prompt, wherein the LLM includes a generative artificial intelligence large language model (GAILLM) or a multimodal large language model (MLLM);

S503, converting the second text into a second speech using a text-to-speech engine configured in the local or the cloud, and sending the second speech to the smart wearable device for playback.

The smart wearable device may include but not limited to, smart safety helmets, smart earphones, smart earrings, smart watches, and smart glasses shown in FIG. 8 and FIG. 9.

Optionally, the first smart mobile terminal 120 generates a translation prompt through a built-in prompt generator; or, the first smart mobile terminal 120 generates, through a prompt generator configured in a cloud server, the translation prompt.

Optionally, in other embodiments of the present disclosure, a mobile application is installed on the smart mobile terminal, and the method further includes:

in response to a preset action of a user, sending a translation instruction to the smart wearable device through the mobile application, so that the smart wearable device enters a translation mode in response to the translation instruction, and picks up the first speech in the translation mode.

Optionally, in other embodiments of the present disclosure, a mobile application is installed on the smart mobile terminal, and before receiving the first speech in the first language sent by the smart wearable device, the method further includes:

in response to a user pressing a button on a screen of the smart mobile terminal, sending, through the mobile application, a speech picking up instruction to the smart wearable device to instruct the smart wearable device to pick up the first speech, wherein the button is generated by the mobile application.

The LLM is configured in a model server, and the step of translating, through the LLM configured in the local or cloud, the first text to obtain the second text in the second language according to the translation prompt, includes:

in response to the user releasing the button, or in response to receiving a notification message sent by the smart wearable device, sending the first text to the translation server through the mobile application, so that the translation server generates the translation prompt, and sends the first text and the translation prompt to the model server, wherein the smart wearable device sends the notification message in response to a user of the smart wearable device releasing a virtual button on a temple of the smart wearable device; and receiving the second text forwarded by the translation server, wherein the second text is sent to the translation server by the model server, and the model server obtains the second text by using the LLM to translate the first text according to the translation prompt.

Optionally, in other embodiments of the present disclosure, a mobile application is installed on the smart mobile terminal, and the method further includes:

generating, through the mobile application, a translation transcript according to the second text, or the first text and the second text, and displaying the translation transcript on a screen of the smart mobile terminal; and saving, through the mobile application, the translation transcript on the smart mobile terminal or a storage server.

Optionally, in other embodiments of the present disclosure, the method further includes: in response to an action of a user performed on a sharing button in a user interface (UI) of the mobile application being detected, sharing, through the mobile application, the translation transcript according to a sharing manner indicated by the action.

Optionally, in other embodiments of the present disclosure, a mobile application is installed on the smart mobile terminal, and before sending the second speech to the smart wearable device for playback, the method further includes:

adjusting, through the mobile application, a playback speed of the second speech to a preset playback speed.

Optionally, in other embodiments of the present disclosure, a mobile application is installed on the smart mobile terminal, the LLM is configured in the model server. The smart wearable device performs a speech picking up action, and sends the picked-up speech to the smart mobile terminal in real time via a Bluetooth in a form of data stream, and the method further includes:

setting up the second language, according to a setting action performed by a user through the mobile application;

the step of converting the first speech into the first text using the speech-to-text engine configured in the local or cloud, and obtaining the translation prompt includes:

receiving a speech sent by the smart wearable device, and detecting whether a language of the received speech is the first language using the speech-to-text engine; and in response to the language being the first language, sending, through the Bluetooth, a starting translation instruction to the smart wearable device to instruct the smart wearable device to enter a translation mode, using the speech-to-text engine to convert the received speech as the first speech into the first text, and generating the translation prompt, wherein the translation prompt includes information of the first language and the second language.

The method further includes: in response to a silence of a preset duration being detected, sending, through the Bluetooth, a stopping translation instruction to the smart wearable device to instruct the smart wearable device to exit the translation mode and end the speech picking up action.

Optionally, in other embodiments of the present disclosure, the first speech is a speech from a user of the smart wearable device, and the method further includes:

sending the second speech to a target terminal, so that the target terminal sends the second speech to a target smart wearable device for playback.

Optionally, in other embodiments of the present disclosure, a mobile application is installed on the smart mobile terminal, and the method further includes:

generating, through the mobile application, a translation prompt, when the smart wearable device is used as a master smart wearable device (i.e., a host) and is paired with a plurality of slave smart wearable devices (i.e., clients);

translating, through the LLM, the first text to obtain a plurality of third texts according to the generated translation prompt, wherein a language of each of the third texts corresponds to a language spoken by a user of each of the slave smart wearable devices; and distributing each of the third texts to corresponding slave smart wearable devices, so that the corresponding slave smart wearable devices convert the received third text into a third speech using a text-to-speech engine, and play the third speech.

In the aforementioned translation method provided by the present disclosure, the smart wearable device has a plurality of translation modes, and specifically may include: a listening mode, a talking mode, a paired mode and a multi-points mode. The multi-points mode can be applied to application scenarios such as tour guide and conference, and that like.

As an application example, taking the smart glasses and the mobile phone as examples, in scenario A of the listening mode:

A-a, a user wearing smart glasses can use this mode to listen to a foreign language speech of the other party using the smart glasses, and use the smart glasses to translate the foreign language speech into a native language speech and play the native language speech;

A-b, the user can set up the foreign language and the native language for translation through a built-in application (APP) of the smart glasses;

A-c, the user can set up the playback speed of the native language speech;

A-d, the user can activate the translation function through a mobile APP on the mobile phone, to trigger the smart glasses to enter the translation mode.

A-e, the user presses-and-holds a virtual button on the smart glasses, or the user presses-and-holds an on-screen button on the UI of the mobile APP on the screen of the mobile phone, and the microphone of the smart glasses starts to listen to the foreign language speech of the other party;

A-f, the smart glasses send the foreign language speech in audio format to the mobile APP in real time via Bluetooth;

A-g, the mobile APP runs a speech-to-text engine (in cloud or local device), to convert the foreign language speech into a foreign language text;

A-h, at the same time, the mobile APP displays the transcript in foreign language, and the transcript in foreign language can be shared or saved;

A-i, when the virtual button on the smart glasses is released, or when the on-screen button of the mobile APP on the screen of the mobile phone is released, the mobile APP sends the foreign language text to the translation server;

A-j, the translation server sends the foreign language text to a LLM (in the cloud or local) together with a translation prompt (generated at the translation server);

A-k, the LLM translates the foreign language text in text format into a native language text, and sends the native language text back to the translation server;

A-l, the translation server sends the native language text back to the mobile APP in text format;

A-m, the mobile APP converts the native language text into a speech through a text-to-speech engine (in the cloud or local device);

A-n, the mobile APP displays the translated transcript in native language on the screen, and the translated transcript in native language can be shared or saved on the mobile phone;

A-o, the mobile APP sends the translated native language speech with a desired playback speed in audio format back to the smart glasses;

A-p, the smart glasses play the translated native language speech through a speaker.

As an application example, taking the smart glasses and the mobile phone as examples, in scenario B of the listening mode:

B-a, similar to the scenario A, but the user does not need to set up the foreign language, and only needs to set up the native language;

B-b, the speech-to-text engine can automatically detect which foreign language it is.

As an application example, taking the smart glasses and the mobile phone as examples, in scenario C of the listening mode:

C-a, extending to the scenario B, the user does not need to use the virtual button on the smart glasses or the on-screen button on the mobile APP to start or stop listening.

C-b, when the speech-to-text engine detects that the speech is in the foreign language, it will automatically start to translate the picked-up speech, and stop the translation after a silence of a duration is detected.

As an application example, taking the smart glasses and the mobile phone as examples, in scenario D of the listening mode:

D-a, similar to the aforementioned scenarios A, B, or C, but without the mobile APP.

D-b, the smart glasses directly send the foreign language speech to the translation server, and directly play the native language speech on the smart glasses, which is received by the translation server.

As an application example, taking the smart glasses and the mobile phone as examples, in scenario E of the talking mode:

E-a, a user wearing smart glasses can use this mode to listen to the user's own native language speech using the smart glasses, and use the smart glasses to play the translated foreign language speech through the attached front speaker;

E-b, the user can set up the native language and the foreign language through a built-in APP of the smart glasses;

E-c, the user can set up the playback speed of the foreign language speech;

E-d, the user activates the translation function through a mobile APP on the mobile phone;

E-e, the user presses-and-holds a virtual button on the smart glasses, or the user presses-and-holds an on-screen button on the UI of the mobile APP on the screen of the mobile phone, and the microphone of the smart glasses starts to listen to the native language speech of the user;

E-f, the smart glasses send the native language speech in audio format to the mobile APP in real time via Bluetooth;

E-g, the mobile APP runs a speech-to-text engine (in cloud or local device), to convert the native language speech into a native language text;

E-h, at the same time, the mobile APP displays a transcript in native language, and the transcript in native language can be shared or saved;

E-i, when the virtual button on the smart glasses is released, or when the on-screen button on the mobile APP is released, the mobile APP sends the native language text in form of text to the translation server;

E-j, the translation server sends the native language text to a LLM (in the cloud or local) together with a translation prompt (generated at the translation server);

E-k, the LLM translates the foreign language text in text format into a foreign language text in text format and sends the foreign language text in text format back to the translation server;

E-l, the translation server sends the foreign language text in text format back to the mobile APP;

E-m, the mobile APP converts the foreign language text into a corresponding foreign language speech through a text-to-speech engine (in the cloud or local device);

E-n, the mobile APP displays a transcript in foreign language, and the transcript in foreign language can be shared or saved;

E-o, the mobile APP sends the foreign language speech with a desired playback speed in audio format back to the smart glasses;

E-p, the smart glasses play the foreign language speech through the front speaker so that the other party can listen.

As an application example, taking the smart glasses and the mobile phone as examples, in scenario F of the talking mode:

F-a, similar to the scenario D, the foreign language speech is played through the mobile APP on the mobile phone, rather than through the front speaker on the smart glasses or the external speakers paired with the smart glasses.

As an application example, taking the smart glasses and the mobile phone as examples, in scenario G of the talking mode:

G-a, similar to the scenario E or scenario F, but the user does not need to release the virtual button on the glasses or the on-screen button on the mobile APP to indicate the end of the speech;

G-b, the listening can be started if the user presses and immediately releases the virtual button on the smart glasses or the on-screen button on the mobile APP;

G-c, the smart glasses can automatically detect whether the user speech has ended through the VAD algorithm or/and IMU signals.

As an application example, taking the smart glasses and the mobile phone as examples, in scenario H of the talking mode, the following actions further can be performed:

H-a, similar to the scenario G, the user does not need to use the on-screen button on the mobile APP or the virtual button on the glasses to start listening;

H-b, when the speech-to-text engine detects that the picked-up speech is in the native language, it will automatically start to translate the picked-up speech.

As an application example, taking the smart glasses and the mobile phone as examples, in scenario I of the talking mode:

I-a, similar to the scenarios E, G, or H, but without the mobile APP;

I-b, the smart glasses directly send the native language speech to the translation server, and play the translated foreign language speech directly through the front speaker on the smart glasses or the external speaker paired with the smart glasses.

As an application example, taking the smart glasses and the mobile phone as examples, in scenario J of the paired mode:

J-a, users A and B wear smart glasses A and B respectively, and speak languages A and B respectively; the smart glasses A and B correspond to mobile phones A and B respectively, and these smart glasses are paired for translation mode;

J-b, the user A presses-and-holds a virtual button on the smart glasses A, or presses-and-holds an on-screen button on the mobile application A, and the microphone of the smart glasses A starts to listen to a speech in language A of the user A;

J-c, the smart glasses A send the speech in language A in audio format in real time to the mobile phone A via Bluetooth;

J-d, the mobile application A use a speech-to-text engine (in cloud or local device) to convert the speech in language A into the first text in language A;

J-e, when the user A releases the virtual button on the smart glasses A, or the on-screen button on the mobile application A, the mobile application A sends the first text in language A form of text to the translation server;

J-f, the translation server sends the first text in language A together with a translation prompt to LLM(s) (in the cloud or local) in form of text;

J-g, the LLM(s) translates the first text in language A in text format into the second text in language B in text format, and sends the second text in language B back to the translation server;

J-h, the translation server sends the second text in language B to the mobile application B in the mobile phone B in text format;

J-i, the mobile application B converts the second text in language B into a speech in language B through a text-to-speech engine (in cloud or local device);

J-j, the mobile application B sends the speech in language B to the smart glasses B in audio format;

J-k, the smart glasses B play the speech in language B through the speaker, so that the user B can listen;

J-l, transcripts of languages A and B (that is, the original transcript of the user A, and the translated transcript of the user A) are displayed on the mobile applications A and B, and can be shared and saved;

J-m, conversely, when the user B wants to communicate with the user A, the user B only needs to repeat the steps from J-b to J-I, the speech of the user B is translated into the speech in language A, and the speech in language A is played on the smart glasses A of the user A.

As an application example, taking the smart glasses and the mobile phone as examples, in scenario K of the multi-points mode:

K-a, users A, B, C and D wear smart glasses A, B, C and D respectively, and speak languages A, B, C and D respectively; the smart glasses A, B, C and D are paired for translation mode, the smart glasses A, B, C and D perform data interaction with mobile phones A, B, C and D via Bluetooth respectively, and mobile applications A, B, C and D are installed on the mobile phones A, B, C and D respectively;

K-b, the user A presses-and-holds the right temple of the smart glasses A and speaks, a microphone of the smart glasses A picks up a speech A in language A of the user A, and sends the speech A to the translation server in the form of text through the mobile application A; the translation server translates the text in language A into texts in languages B, C and D, and sends the translated texts to the corresponding smart glasses B, C and D respectively; the smart glasses B, C and D respectively convert the received text into corresponding speech through the speech-to-text engine, and then play the converted speech to their respective users through their respective speakers.

K-c, when the user B wants to communicate with the user A, the user B presses-and-holds the right temple of the smart glasses B and speaks, the microphone of smart glasses B picks up a speech of the user B and converts the picked-up speech in language B into a text in language B through the speech-to-text engine, and the text in language B is sent to the translation server by the smart glasses B; the translation server translates the text in language B into a text in language A, and then sends the text in language A to smart glasses A; the smart glasses A use a text-to-speech engine to convert the text in language A into a speech in language A, and then play the speech in language A through the speaker of smart glasses A.

K-d, the users C and D communicate with the user A in different languages through the steps K-c.

In order to further illustrate the aforementioned four translation modes, the following will be described with reference to FIG. 11 to FIG. 14.

Figure 11:
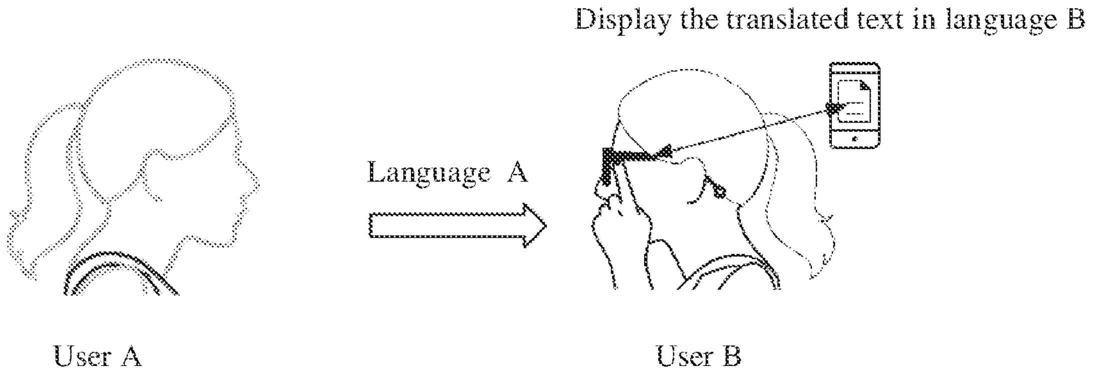
FIG. 11 is a schematic diagram of implementing a first translation mode in the translation system shown in FIG. 1 and the translation method shown in FIG. 10.

As shown in FIG. 11, in the listening mode, the user A doesn't wear the smart glasses, and the user B wears the smart glasses. The smart glasses worn on the user B establish a data connection with a mobile APP on a mobile phone of the user B via Bluetooth. The user B can set up the language A spoken by the user A and the language B spoken by the user B through the mobile APP, and switch the current translation mode to the listening mode. In the listening mode, the language A spoken by the user A is the first language (i.e., the source language), and the language B spoken by the user B is the second language (i.e., the target language).

When the user B presses-and-holds a virtual button on the right temple of smart glasses worn on the user B, the user A starts speaking, and the smart glasses pick up a speech of user A through the microphone and send the picked-up speech in language A of the user A to the mobile APP. When the user B releases the virtual button, the mobile APP uses the LLM to translate the received speech into a speech in language B, and sends the speech in language B to the smart glasses, so that the smart glasses play the speech in language B for the user B through the built-in speaker.

At the same time, the mobile APP displays the original text in language A corresponding to the speech of user A and the translated text in language B on the screen of the mobile phone of user B.

Figure 12:
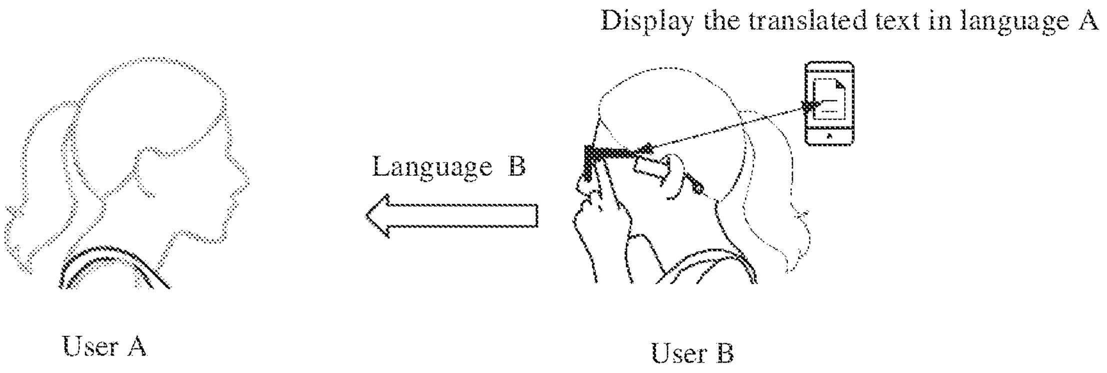
FIG. 12 is a schematic diagram of implementing a second translation mode in the translation system shown in FIG. 1 and the translation method shown in FIG. 10.

As shown in FIG. 12, in the talking mode, the user A doesn't wear the smart glasses, and the user B wears the smart glasses. The smart glasses worn on the user B establish a data connection with a mobile APP on a mobile phone of the user B via Bluetooth. The user B can set up the language A spoken by the user A and the language B spoken by the user B through the mobile APP, and switch the current translation mode to the talking mode. In the talking mode, the language B spoken by the user B is the first language (i.e., the source language), and the language A spoken by the user A is the second language (i.e., the target language).

When the user B presses-and-holds a virtual button on the right temple of smart glasses worn on the user B, the user B starts speaking, and the smart glasses pick up a speech of user B through the microphone and send the picked-up speech in language B of user B to the mobile APP. When the user B releases the virtual button, the mobile APP uses the LLM to translate the received speech into a speech in language A, and sends the speech in language A to the smart glasses, so that the smart glasses play the speech in language A for the user A through the front speaker.

At the same time, the mobile APP displays the original text in language B corresponding to the speech of user B and the translated text in language A on the screen of the mobile phone of user B.

Furthermore, the listening mode shown in FIG. 11 may be combined with the talking mode shown in FIG. 12. Specifically, the user A doesn't wear the smart glasses, and the user B wears the smart glasses. The smart glasses worn on the user B establish the data connection with the mobile APP on the mobile phone of the user B via Bluetooth.

On the one hand, when the user B presses-and-holds the virtual button on the right temple of smart glasses worn on the user B, the smart glasses enter the listening mode, and the smart glasses pick up the speech of user A through the microphone and send the picked-up speech in language A of user A to the mobile APP.

When the user B releases the virtual button, the smart glasses translate, through the mobile APP, the speech in language A into the speech in language B using the LLM, and play the speech in language B for the user B through the built-in speaker. At the same time, the mobile APP displays the original text in language A corresponding to the speech in language A and the translated text in language B on the screen of the mobile phone of user B.

On the other hand, when the smart glasses detect, through the VAD algorithm and/or the IMU sensor on the smart glasses, that the user B starts speaking, the smart glasses switch the current translation mode from the listening mode to the talking mode, pick up the speech of the user B through the microphone, and send the picked-up speech in language B of the user B to the mobile APP.

When the smart glasses detect, through the VAD algorithm and/or the IMU sensor on the smart glasses, that the user B stops speaking, the smart glasses translate, through the mobile APP, the speech in language B into the speech in language A using the LLM, and play the speech in language A for the user A through the front speaker of the smart glasses, or the external speaker, or the mobile phone. At the same time, the mobile APP displays the original text in language B corresponding to the speech in language B and the translated text in language A on the screen of the mobile phone of user B.

Figure 13:
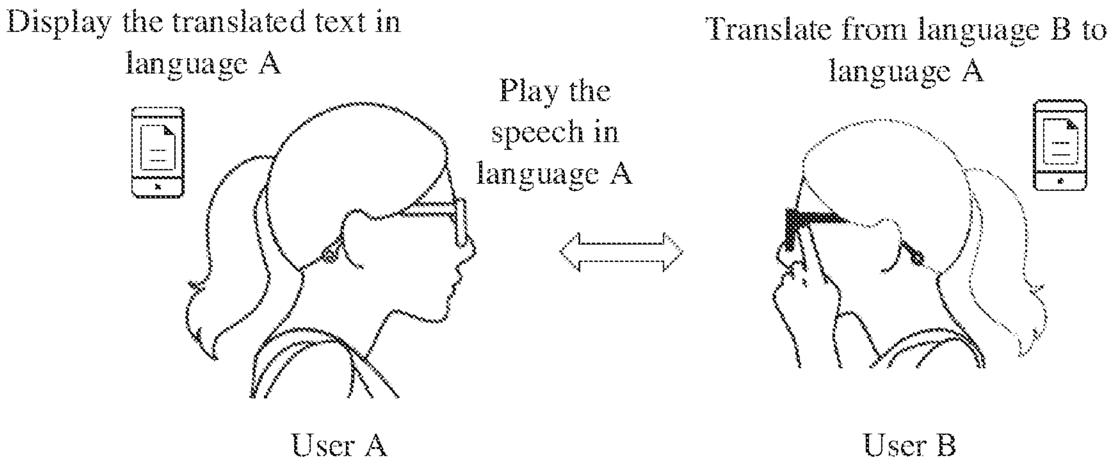
FIG. 13 is a schematic diagram of implementing a third translation mode in the translation system shown in FIG. 1 and the translation method shown in FIG. 10.

As shown in FIG. 13, in the paired mode, the user A wears the smart glasses A, and the user B wears the smart glasses B. The smart glasses A worn on the user A establish the data connection with the mobile APP on the mobile phone A of the user A via Bluetooth. The smart glasses B worn on the user B establish the data connection with the mobile APP on the mobile phone B of the user B via Bluetooth. The smart glasses A and the smart glasses B are paired through the mobile phone A and the mobile phone B.

Through the mobile APP on the mobile phone A, the user A can set up the language A spoken by the user A and the language B spoken by the user B, and switch the current translation mode to the paired mode. In the paired mode, in the mobile phone A, the language A spoken by the user A is the first language (i.e., the source language), and the language B spoken by the user B is the second language (i.e., the target language).

Through the mobile APP on the mobile phone B, the user B can set up the language B spoken by the user B and the language A spoken by the user A, and switch the current translation mode to the paired mode. In the paired mode, in the mobile phone B, the language B spoken by the user B is the first language (i.e., the source language), and the language A spoken by the user A is the second language (i.e., the target language).

When the user B presses-and-holds the virtual button on the right temple of smart glasses B worn on the user B, the user B starts speaking, and the smart glasses B pick up the speech of user B through the microphone and send the picked-up speech in language B to the mobile APP on the mobile phone B. When the user B releases the virtual button, the mobile APP on the mobile phone B translates the speech in language B into the text in language A using the LLM, and sends the text in language A to the mobile APP on the mobile phone A. The mobile APP on the mobile phone A converts the text in language A into the corresponding speech in language A, and sends the speech in language A to the smart glasses A for playback.

When the user A presses-and-holds the virtual button on the right temple of smart glasses A worn on the user A, the smart glasses A and the mobile phone A translate the picked-up the speech in language A of user A into the text in language B and send the text in language B to the mobile APP on mobile phone B in the similar manner to the user B. The mobile APP on the mobile phone B converts the text in language B into the corresponding speech in language B, and sends the speech in language B to the smart glasses B for playback.

Furthermore, the mobile APP on the mobile phone A displays the original text and the translated text processed by itself on the screen of mobile phone A. The mobile APP on the mobile phone B displays the original text and the translated text processed by itself on the screen of mobile phone B.

Furthermore, the mobile phones A and B can further display the original text and the translated text processed by the other party on their respective screens through sharing.

Figure 14:
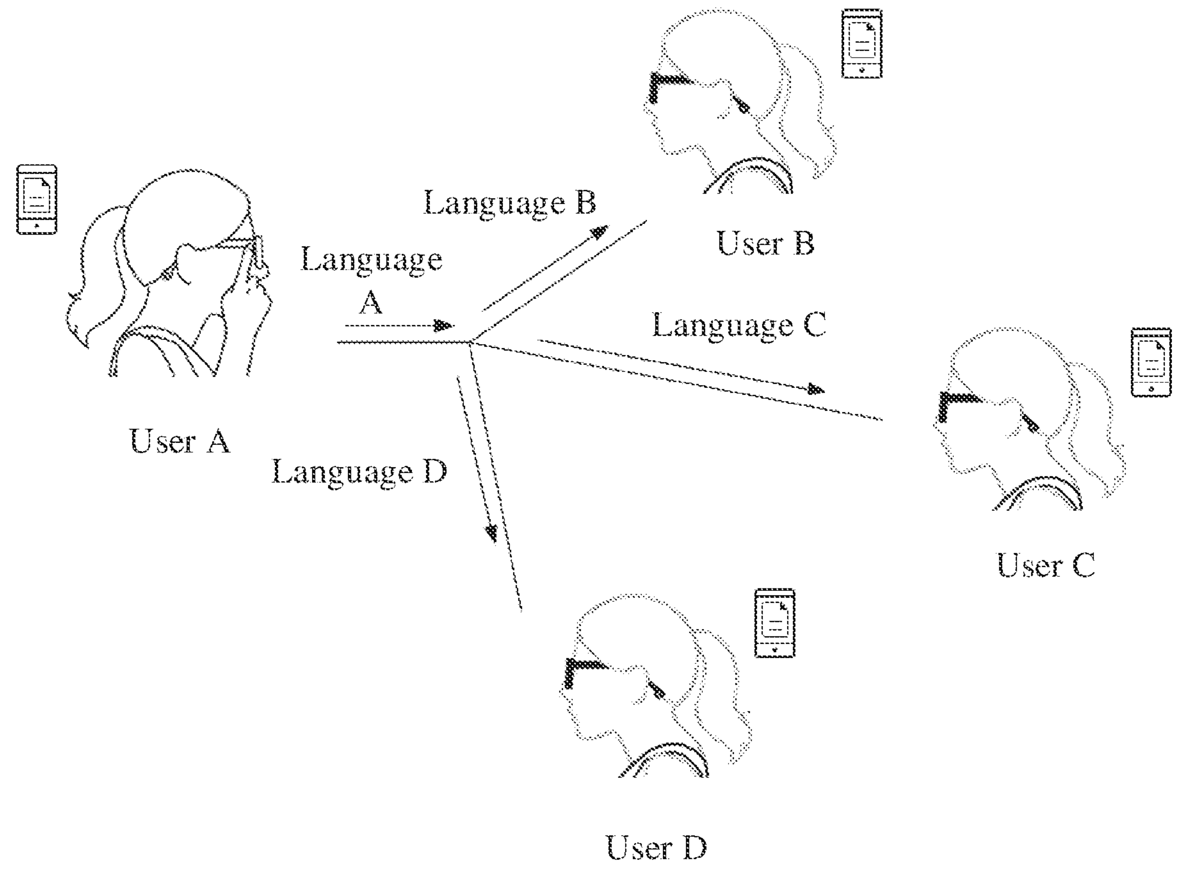
FIG. 14 is a schematic diagram of implementing a fourth translation mode in the translation system shown in FIG. 1 and the translation method shown in FIG. 10.

As shown in FIG. 14, in the multi-points mode of tour guide, the users A, B, C and D wear smart glasses A, B, C and D respectively. The user A is a tour guide, and the smart glasses A worn on the user A are host (i.e., the master smart glasses). The users B, C, and D are tourists, and the smart glasses B, C, and D worn on the users B, C, and D are clients (i.e., slave smart glasses). The smart glasses A, B, C and D establish data connections with mobile phones A, B, C and D respectively.

When the user A presses the virtual button on the smart glasses A, the smart glasses A pick up the speech in language A of the user A, and then use the translation method in the aforementioned embodiments to translate, through the data interaction with the mobile phone A, the speech in language A into the speech in language B, the speech in language C and the speech in language D, and send the speech in language B, the speech in language C and the speech in language D to the smart glasses B, C and D respectively.

When the user B presses the virtual button on the smart glasses B, the smart glasses B pick up the speech in language B of the user B, and then use the translation method in the aforementioned embodiments to translate, through the data interaction with the mobile phone B, the speech in language B into the speech in language A, and send the speech in language A to the smart glasses A.

Furthermore, the terminal responsible for translation can further generate translation transcripts based on the original text and the translated text, and distribute the translation transcripts to each smart glasses and/or each mobile phone for sharing.

For unspecified details about the translation method in this embodiment, please refer to the relevant descriptions in the embodiments shown in FIG. 1 to FIG. 9, which will not be described again here.

In the embodiment, by using the smart mobile terminal combined with the LLM, the intelligent translation based on the smart glasses is realized, thereby improving the practicality, interactivity and intelligence of the smart glasses, and increasing the user stickiness in the product. Moreover, due to the scalability and self-creativity of the LLM, the accuracy of translation can be further improved.

The present disclosure further provides a non-transitory computer-readable storage medium, which can be set in the smart glasses or smart wearable device or smart mobile terminal in the above-mentioned embodiments, and may be the memory 204 in the embodiment shown in FIG. 8. The computer-readable storage medium stores one or more computer programs. When the one or more programs are executed by the processor, all or part of the translation method based on AI, in the above-mentioned embodiment(s) is performed. Further, the computer-readable storage medium may also be a USB flash drive, a mobile hard disk, a read-only memory (ROM), a Random Access Memory (RAM), a disk, or a CD-ROM, or any medium capable of storing program code.

It should be understood that in the above-described embodiments of the present disclosure, the above-mentioned smart glasses, translation system and translation method may be implemented in other manners. For example, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above is a description of the smart glasses, translation system and translation method provided by the present disclosure. Those skilled in the art should understand that based on the embodiments of the present disclosure, there may be changes in specific implementation methods and application scope. Therefore, the content of this specification should not be construed as limiting the present disclosure.

What is claimed is:

1. A translation system based on artificial intelligence, comprising: first smart glasses, a first smart mobile terminal and a cloud server, wherein the cloud server is configured with a large language model (LLM), and the LLM comprises a generative artificial intelligence large language model or a multimodal large language model;

the first smart glasses are configured to: pick up a first speech in a first language from a preset direction, and send the first speech to the first smart mobile terminal via Bluetooth;

the first smart mobile terminal is configured to: convert the first speech into a first text using a speech-to-text engine, and send the first text to the cloud server, wherein the speech-to-text engine is configured in the first smart mobile terminal or cloud;

the cloud server is configured to: translate, through the LLM, the first text to obtain a second text in a second language according to a translation prompt, and send the second text to the first smart mobile terminal;

the first smart mobile terminal is further configured to: convert the second text into a second speech using a text-to-speech engine, and send the second speech to the first smart glasses, wherein the text-to-speech engine is configured in the first smart mobile terminal or cloud; and the first smart glasses are further configured to play the second speech;

wherein a mobile application is installed on the first smart mobile terminal;

the first smart mobile terminal is further configured to: set up the second language, according to a setting action performed by a user through the mobile application;

the first smart glasses are further configured to: perform a speech picking up action, and send a picked-up speech to the first smart mobile terminal in real time via Bluetooth in a form of data stream;

the first smart mobile terminal is further configured to:

detecting, through the speech-to-text engine, whether a language of the received speech is the first language;

in response the language being the first language, send a starting translation instruction to the first smart glasses via the Bluetooth, convert the received speech as the first speech into a first text through the speech-to-text engine, and send the first text and the translation prompt to the model server, wherein the translation prompt comprises information of the first language and the second language; and in response to a silence of a preset duration being detected, send a stopping translation instruction to the first smart glasses via the Bluetooth; and the first smart glasses are further configured to: enter a translation mode in response to the starting translation instruction, and in response to the stopping translation instruction, exit the translation mode and end the speech picking up action.

2. The translation system of claim 1, wherein a mobile application is installed on the first smart mobile terminal;

the first smart mobile terminal is further configured to send, through the mobile application, a translation instruction to the first smart glasses in response to a preset action of a user; and the first smart glasses are further configured to: enter a translation mode in response to the translation instruction, and pick up the first speech from the preset direction in the translation mode.

3. The translation system of claim 1, wherein the cloud server comprises a translation server and a model server, a mobile application is installed on the first smart mobile terminal, and the LLM is configured in the model server;

the first smart mobile terminal is further configured to, in response to a user pressing a button on a screen of the first smart mobile terminal, send a speech picking up instruction to the first smart glasses through the mobile application, wherein the button is generated by the mobile application;

the first smart glasses are further configured to pick up the first speech from the preset direction in response to the speech picking up instruction;

the first smart mobile terminal is further configured to, in response to the user releasing the button, send the first text to the translation server through the mobile application;

the translation server is configured to: generate the translation prompt, and send the first text and the translation prompt to the model server;

the model server is configured to: translate, through the LLM, the first text to obtain the second text according to the translation prompt, and send the second text to the translation server; and the translation server is further configured to send the second text to the first smart mobile terminal.

4. The translation system of claim 1, wherein the cloud server comprises a translation server and a model server, a mobile application is installed on the first smart mobile terminal, and the LLM is configured in the model server;

the first smart glasses are further configured to, in response to a user pressing a virtual button on a temple of the first smart glasses, pick up the first speech from the preset direction;

the first smart glasses are further configured to, in response to the user releasing the virtual button, send a notification message to the mobile application via Bluetooth;

the first smart mobile terminal is further configured to send the first text to the translation server through the mobile application according to the notification message;

the translation server is configured to: generate the translation prompt, and send the first text and the translation prompt to the model server;

the model server is configured to: translate, through the LLM, the first text to obtain the second text according to the translation prompt, and send the second text to the translation server; and the translation server is further configured to send the second text to the first smart mobile terminal.

5. The translation system of claim 1, wherein a mobile application is installed on the first smart mobile terminal, and the first smart mobile terminal is further configured to:

generate, through the mobile application, a translation transcript according to the second text, or the first text and the second text, and display the translation transcript on a screen of the first smart mobile terminal; and save, through the mobile application, the translation transcript on the first smart mobile terminal or a storage server.

6. The translation system of claim 5, wherein the first smart mobile terminal is further configured to, in response to an action of a user performed on a sharing button in a user interface of the mobile application being detected, share the translation transcript through the mobile application according to a sharing manner indicated by the action.

7. The translation system of claim 1, wherein a mobile application is installed on the first smart mobile terminal, and the first smart mobile terminal is further configured to:

generate, through the mobile application, the second speech with a preset playback speed; and send, via the Bluetooth, the second speech with the preset playback speed to the first smart glasses for playback.

8. The translation system of claim 1, wherein the cloud server comprises a translation server and a model server, the LLM is configured in the model server;

the first smart glasses are further configured to send the first speech to the translation server via a wireless network;

the translation server is configured to: convert the first speech into a first text using a speech-to-text engine, generate the translation prompt, and send the first text and the translation prompt to the model server;

the model server is configured to: translate, through the LLM, the first text to obtain the second text according to the translation prompt, and send the second text to the translation server; and the translation server is further configured to: convert the second text into the second speech using a text-to-speech engine, and send the second speech to the first smart glasses via the wireless network.

9. The translation system of claim 1, wherein the preset direction points to front of a user of the first smart glasses, or a mouth of the user of the first smart glasses.

10. The translation system of claim 1, wherein the preset direction points to a mouth of a user of the first smart glasses, and the translation system further comprises second smart glasses and a second smart mobile terminal;

the first smart mobile terminal is further configured to send the second speech to the second smart mobile terminal;

the second smart mobile terminal is configured to send the second speech to the second smart glasses; and the second smart glasses are configured to play the second speech.

11. The translation system of claim 10, wherein the first smart mobile terminal is further configured to: generate, through a mobile application on the first smart mobile terminal, a translation transcript in real time according to the first text and the second text, store the translation transcript in the first smart mobile terminal, display the translation transcript, and synchronize the translation transcript to the second smart mobile terminal; and the second smart mobile terminal is further configured to: store the translation transcript in the second smart mobile terminal, and display the translation transcript through a mobile application on the second smart mobile terminal.

12. The translation system of claim 1, wherein the cloud server comprises a translation server, the translation system further comprises a plurality of second smart glasses, and the LLM is configured in the translation server;

the first smart glasses are further configured to: in response to a user of the first smart glasses pressing a button on a temple of the first smart glasses, pick up the first speech of a user of the first smart mobile terminal, and send the first speech to the first smart mobile terminal via Bluetooth;

the first smart mobile terminal is further configured to: convert, through a mobile application on the first smart mobile terminal, the first speech into the first text using the speech-to-text engine, and send the first text to the translation server;

the translation server is configured to: generate a first translation prompt, translate, through the LLM, the first text to obtain a plurality of third texts according to the first translation prompt, and distribute each of the third texts to corresponding second smart glasses, wherein a language of each of the third texts corresponds to a language spoken by a user of each of the second smart glasses; and the second smart glasses are configured to: convert the received third text into a third speech using a text-to-speech engine, and play the third speech.

13. The translation system of claim 12, wherein the second smart glasses are further configured to: in response to a user of the second smart glasses pressing a virtual button on a temple of the second smart glasses, pick up a fourth speech of a user of the second smart glasses, convert the fourth speech into a fourth text through a speech-to-text engine, and send the fourth text to the translation server;

the translation server is configured to: generate a second translation prompt, translate, through the LLM, the fourth text to obtain a fifth text according to the second translation prompt, and send the fifth text to the first smart glasses, wherein a language of the fifth text corresponds to a language spoken by a user of the first smart glasses; and the first smart glasses are further configured to: convert the fifth text into a fifth speech using a text-to-speech engine, and play the fifth speech.

14. The translation system of claim 1, wherein the cloud server comprises a model server, and the LLM is configured in the model server.

15. The translation system of claim 1, wherein the first smart mobile terminal is further configured to: generate the translation prompt, and send the translation prompt to the cloud server.

16. Smart glasses for translation based on artificial intelligence, comprising: a speech pickup device, an output device, a processor and a memory, wherein the processor is electrically connected to the speech pickup device, the output device and the memory;

one or more computer programs executable on the processor are stored in the memory, and the one or more computer programs comprise instructions to:

pick up a first speech in a first language from a preset direction through the speech pickup device;

translate, through a large language model (LLM) configured in the local or cloud, the first speech to obtain a second speech in a second language, wherein the LLM comprises a generative artificial intelligence large language model or a multimodal large language model; and output the second speech through the output device;

wherein the smart glasses further comprise: an inertial measurement unit (IMU) electrically connected to the processor, and the instructions are further configured to:

detect whether the first speech ends using a voice activity detection algorithm and/or sensing data of the IMU; and in response to the end of the first speech being detected, translate, through the LLM, the first speech to obtain the second speech.

17. The smart glasses of claim 16, wherein the preset direction points to front of a user.

18. The smart glasses of claim 16, wherein a client program is installed on the smart glasses, and the instructions are further configured to set up the first language and/or the second language according to a first preset action of a user performed on the client program.

19. The smart glasses of claim 18, wherein the instructions are further configured to set up a playback speed of the second speech according to a second preset action of the user performed on the client program.

20. The smart glasses of claim 16, wherein the smart glasses further comprise a Bluetooth component electrically connected to the processor, and the instructions are further configured to:

receive, through the Bluetooth component, a translation instruction sent by a mobile application on a smart mobile terminal; and enter a translation mode in response to the translation instruction, and pick up the first speech from the preset direction through the speech pickup device in the translation mode.

21. The smart glasses of claim 20, wherein the smart glasses further comprise: a temple, and a virtual button provided on the temple, and wherein the virtual button is based on a touch sensor and is electrically connected to the processor, and the instructions are further configured to:

in response the user pressing the virtual button, control the speech pickup device to pick up the first speech; and in response to the user releasing the virtual button, send, through the Bluetooth component, the first speech to the smart mobile terminal, so as to translate, through the smart mobile terminal, the first speech into the second speech using a LLM configured in the smart mobile terminal or a cloud server; and receive, through the Bluetooth component, the second speech sent by the smart mobile terminal.

22. The smart glasses of claim 16, wherein the instructions are further configured to:

perform, through a speech-to-text engine in the local or cloud, a language detection on the first speech to determine whether the first language is a preset language;

in response to the first language being the preset language, enter a translation mode, and convert the first speech into a first text through the speech-to-text engine;

generate a translation prompt, and translate, through the LLM, the first text to obtain a second text in the second language, wherein the translation prompt comprises information of the first language and the second language;

convert, through a text-to-speech engine configured in the local or cloud, the second text into the second speech; and in response to a silence of a preset duration being detected by the speech pickup device, exit the translation mode.

23. The smart glasses of claim 16, wherein the smart glasses further comprise a wireless communication component electrically connected to the processor, and the instructions are further configured to:

send, through the wireless communication component, the first speech to a translation server, so as to translate, by the translation server, the first speech into the second speech using a LLM configured in the translation server or a model server; and receive, through the wireless communication component, the second speech sent by the translation server.

24. The smart glasses of claim 16, wherein the output device comprises a front speaker, the preset direction points to a mouth of a user, and the instructions are further configured to play the second speech through the front speaker.

25. The smart glasses of claim 16, wherein the smart glasses further comprise a Bluetooth component electrically connected to the processor, the preset direction points to a mouth of a user, and the instructions are further configured to: send, through the Bluetooth component, the second speech to an external player for playback.

26. A translation method based on artificial intelligence, applied to a smart mobile terminal, comprising:

receiving a first speech in a first language sent by a smart wearable device, converting the first speech into a first text using a speech-to-text engine configured in the local or cloud, and obtaining a translation prompt;

translating, through a large language model (LLM) configured in the local or the cloud, the first text to obtain a second text in a second language according to the translation prompt, wherein the LLM comprises a generative artificial intelligence large language model or a multimodal large language model; and converting the second text into a second speech using a text-to-speech engine configured in the local or the cloud, and sending the second speech to the smart wearable device for playback;

wherein a mobile application is installed on the smart mobile terminal, and the LLM is configured in a model server;

the smart wearable device performs a speech picking up action, and sends a picked-up speech to the smart mobile terminal in real time via a Bluetooth in a form of data stream;

the method further comprises:

setting up the second language, according to a setting action performed by a user through the mobile application;

the step of converting the first speech into the first text using the speech-to-text engine configured in the local or the cloud, and obtaining the translation prompt comprises:

receiving a speech sent by the smart wearable device, and detecting whether a language of the received speech is the first language using the speech-to-text engine; and in response to the language being the first language, sending, through the Bluetooth, a starting translation instruction to the smart wearable device to instruct the smart wearable device to enter a translation mode, using the speech-to-text engine to convert the received speech as the first speech into the first text, and generating the translation prompt, wherein the translation prompt comprises information of the first language and the second language; and the method further comprises:

in response to a silence of a preset duration being detected, sending, through the Bluetooth, a stopping translation instruction to the smart wearable device to instruct the smart wearable device to exit the translation mode and end the speech picking up action.

27. The translation method of claim 26, wherein a mobile application is installed on the smart mobile terminal, and the method further comprises:

in response to a preset action of a user, sending a translation instruction to the smart wearable device through the mobile application, so that the smart wearable device enters a translation mode in response to the translation instruction, and picks up the first speech in the translation mode.

28. The translation method of claim 26, wherein a mobile application is installed on the smart mobile terminal, and before receiving the first speech in the first language sent by the smart wearable device, the method further comprises:

in response to a user pressing a button on a screen of the smart mobile terminal, sending, through the mobile application, a speech picking up instruction to the smart wearable device to instruct the smart wearable device to pick up the first speech, wherein the button is generated by the mobile application; and wherein the LLM is configured in a model server, and the step of translating, through the LLM configured in the local or the cloud, the first text to obtain the second text in the second language according to the translation prompt comprises:

in response to the user releasing the button, or in response to receiving a notification message sent by the smart wearable device, sending, through the mobile application, the first text to a translation server, so that the translation server generates the translation prompt, and sends the first text and the translation prompt to the model server, wherein the smart wearable device sends the notification message in response to a user of the smart wearable device releasing a virtual button on a temple of the smart wearable device; and receiving the second text forwarded by the translation server, wherein the second text is sent to the translation server by the model server, and the model server obtains the second text by using the LLM to translate the first text according to the translation prompt.

29. The translation method of claim 26, wherein a mobile application is installed on the smart mobile terminal, and the method further comprises:

generating, through the mobile application, a translation transcript according to the second text, or the first text and the second text, and displaying the translation transcript on a screen of the smart mobile terminal; and saving, through the mobile application, the translation transcript on the smart mobile terminal or a storage server.

30. The translation method of claim 29, wherein the method further comprises:

in response to an action of a user performed on a sharing button in a user interface of the mobile application being detected, sharing, through the mobile application, the translation transcript according to a sharing manner indicated by the action.

31. The translation method of claim 26, wherein a mobile application is installed on the smart mobile terminal, and before sending the second speech to the smart wearable device for playback, the method further comprises:

adjusting, through the mobile application, a playback speed of the second speech to a preset playback speed.

32. The translation method of claim 26, wherein the first speech is a speech from a user of the smart wearable device, and the method further comprises:

sending the second speech to a target terminal, so that the target terminal sends the second speech to a target smart wearable device for playback.

33. The translation method of claim 26, wherein a mobile application is installed on the smart mobile terminal, and the method further comprises:

generating, through the mobile application, a translation prompt, when the smart wearable device is used as a master smart wearable device and is paired with a plurality of slave smart wearable devices;

translating, through the LLM, the first text to obtain a plurality of third texts according to the generated translation prompt, wherein a language of each of the third texts corresponds to a language spoken by a user of each of the slave smart wearable devices; and distributing each of the third texts to corresponding slave smart wearable devices, so that the corresponding slave smart wearable devices convert the received third text into a third speech using a text-to-speech engine, and play the third speech.

* * * * *